(12) United States Patent
Young et al.

(10) Patent No.: US 6,234,737 B1
(45) Date of Patent: *May 22, 2001

(54) ROBOTIC CONTAINER HANDLER SYSTEM

(76) Inventors: Richard C. Young, 3631 Patty Ct., Bonita Springs, FL (US) 34134-7573; Ronald E. Ward, 2463 Pidgeonroost Rd., Boonis Camp, KY (US) 41204

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,073

(22) Filed: Jul. 22, 1997

(51) Int. Cl.[7] .................................................. B65G 59/06
(52) U.S. Cl. .............................. 414/277; 414/749; 901/16
(58) Field of Search .................................. 414/217, 278, 414/749; 901/16

(56) References Cited

U.S. PATENT DOCUMENTS

| | | |
|---|---|---|
| 1,996,618 | 4/1935 | Hayer . |
| 3,278,053 | 10/1966 | Cribe et al. . |
| 3,662,860 | 5/1972 | Burch . |
| 3,760,956 | 9/1973 | Burch . |
| 3,854,604 | 12/1974 | Peterson et al. . |
| 3,899,979 | 8/1975 | Godsey, Jr. . |
| 4,299,379 | 11/1981 | Preston et al. . |
| 4,364,206 | 12/1982 | Kranzimuller . |
| 4,734,643 | 3/1988 | Bubenik et al. . |
| 4,800,818 | 1/1989 | Kawaguchi . |
| 4,805,761 | 2/1989 | Totsch . |
| 4,824,311 | 4/1989 | Minus . |
| 4,844,679 | 7/1989 | Teraniski . |
| 4,967,130 | 10/1990 | Sorensen et al. . |
| 5,032,053 | 7/1991 | Krieg . |
| 5,158,021 | * 10/1992 | Matsui et al. ................. 104/292 |
| 5,186,336 | 2/1993 | Pippin et al. . |
| 5,201,397 | 4/1993 | Isaacs . |
| 5,228,820 | * 7/1993 | Stansfield et al. ............. 414/278 |
| 5,234,303 | * 8/1993 | Koyano ........................ 414/217 |
| 5,277,125 | 1/1994 | DiFouso et al. . |
| 5,326,219 | 7/1994 | Pippin et al. . |
| 5,346,351 | 9/1994 | Priolo et al. . |
| 5,385,243 | 1/1995 | Jackson et al. . |
| 5,388,946 | 2/1995 | Baur . |
| 5,551,350 | 9/1996 | Yamada et al. . |
| 5,582,324 | 12/1996 | Pippin et al. . |
| 5,593,267 | 1/1997 | McDonald et al. . |
| 5,634,562 | 6/1997 | Isaacs . |
| 5,668,452 | * 9/1997 | Villarrreal et al. ............. 318/568 |

* cited by examiner

Primary Examiner—Gregory A. Morse
(74) Attorney, Agent, or Firm—Carrithers Law Office; David W. Carrithers

(57) ABSTRACT

A robotic parts handler system for removing containers filled with articles from a sorting, feeding and/or stacking apparatus such as a mail or package sorting apparatus, and moving the container to a selected location for insertion into another conveying system, transport device, carrier, or other apparatus at extremely high speeds.

22 Claims, 34 Drawing Sheets

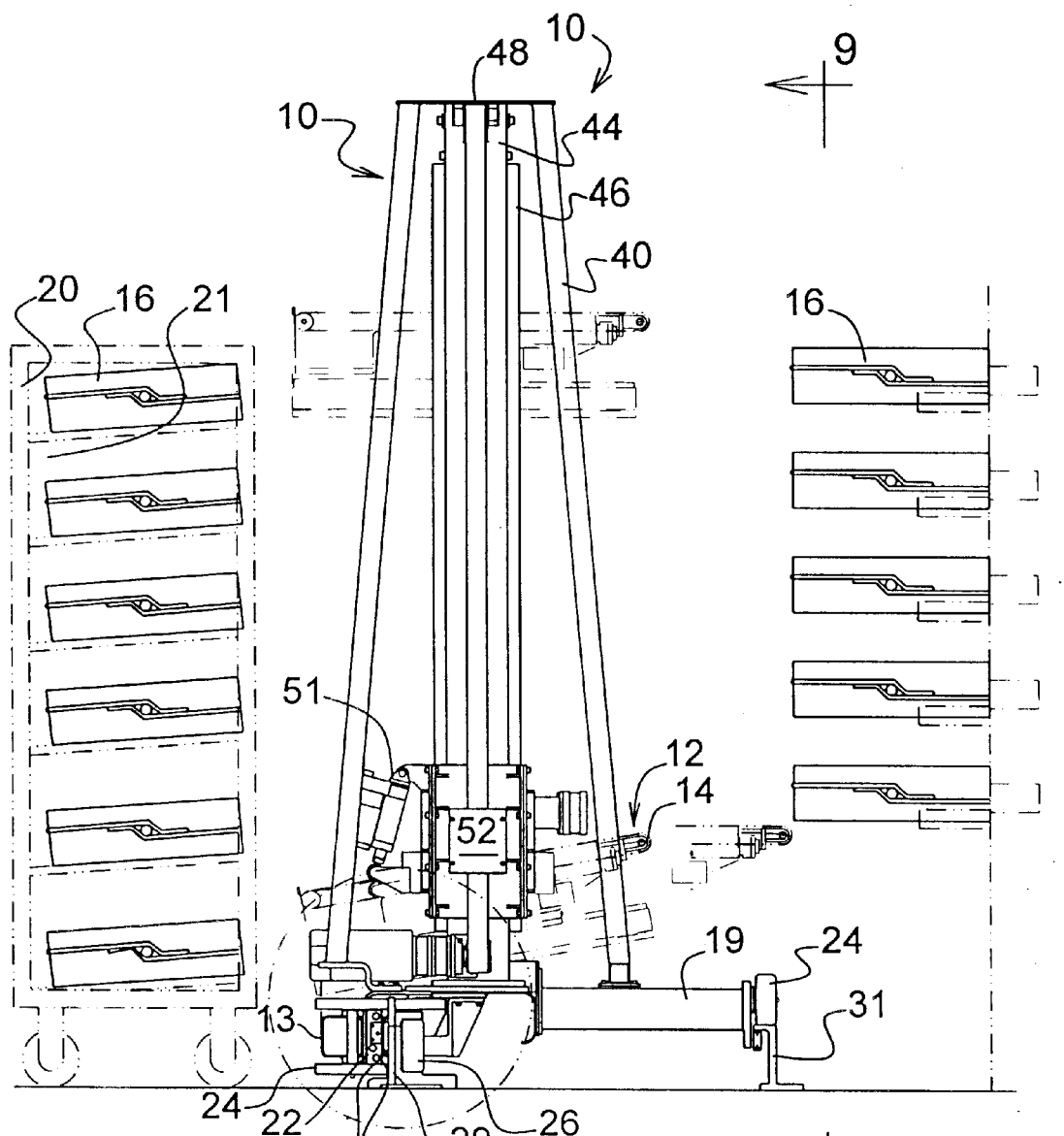
FIG. 4
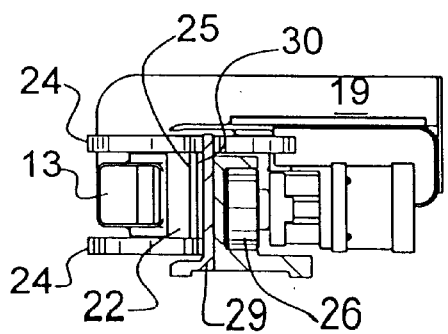

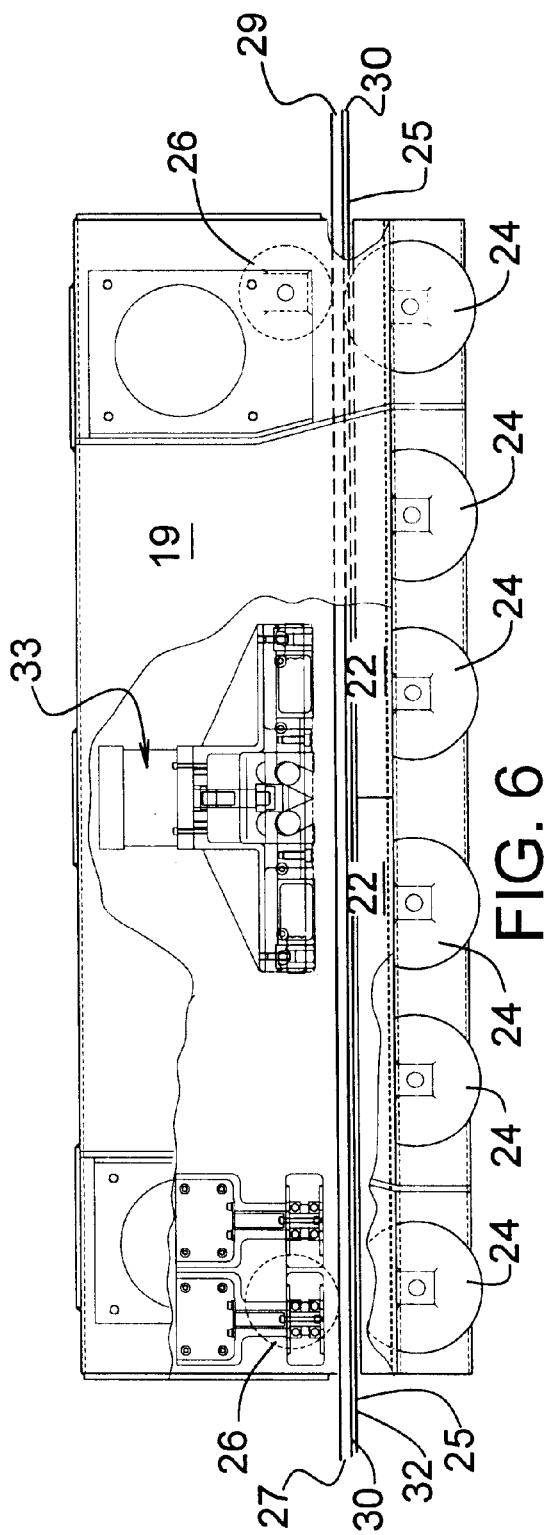
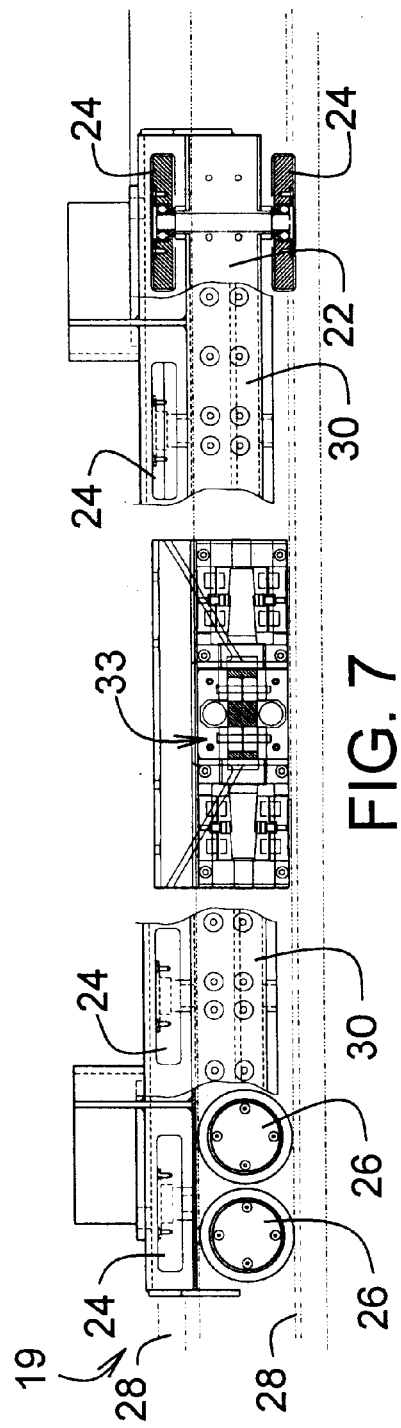
FIG. 6
FIG. 7

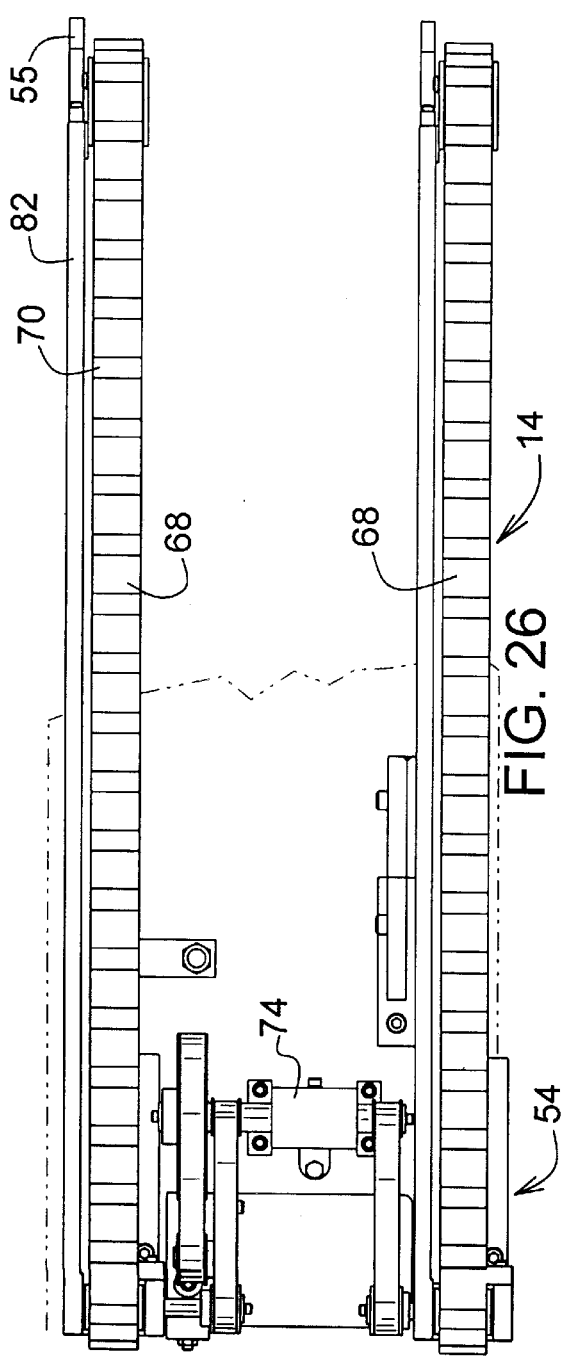
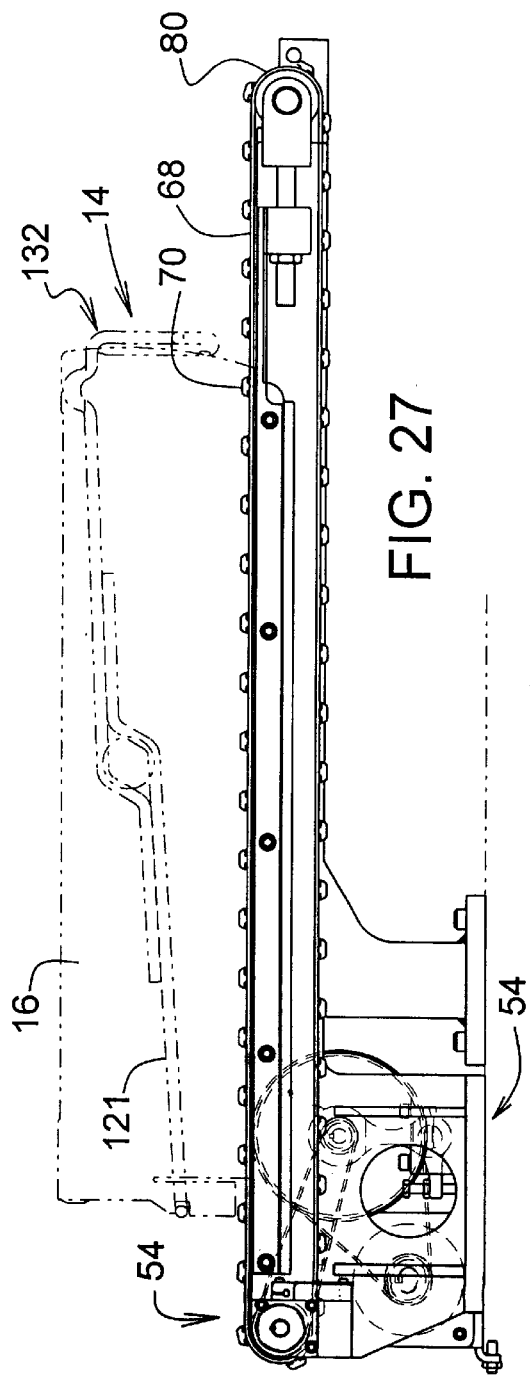

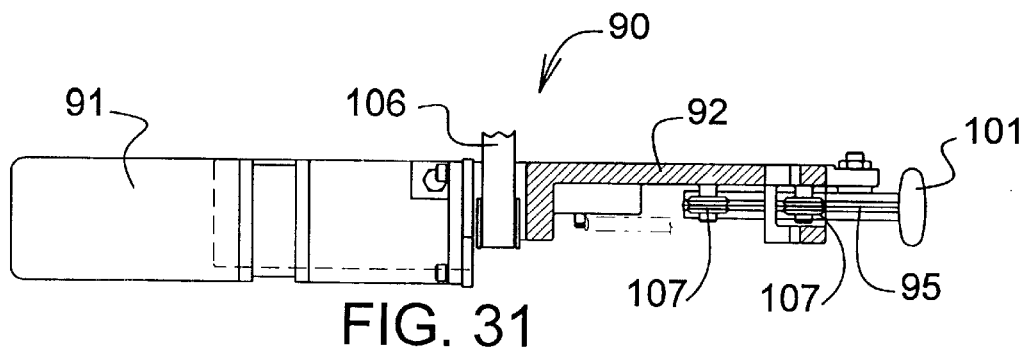
FIG. 31
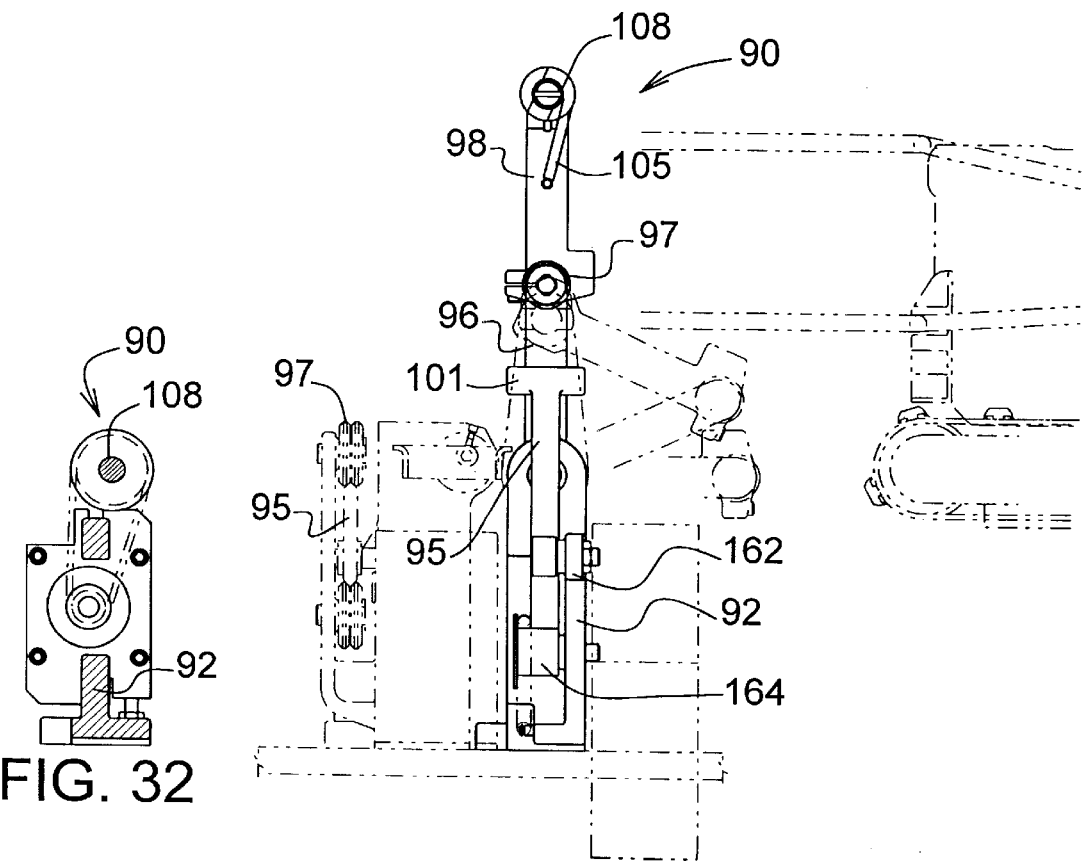
FIG. 32
FIG. 33

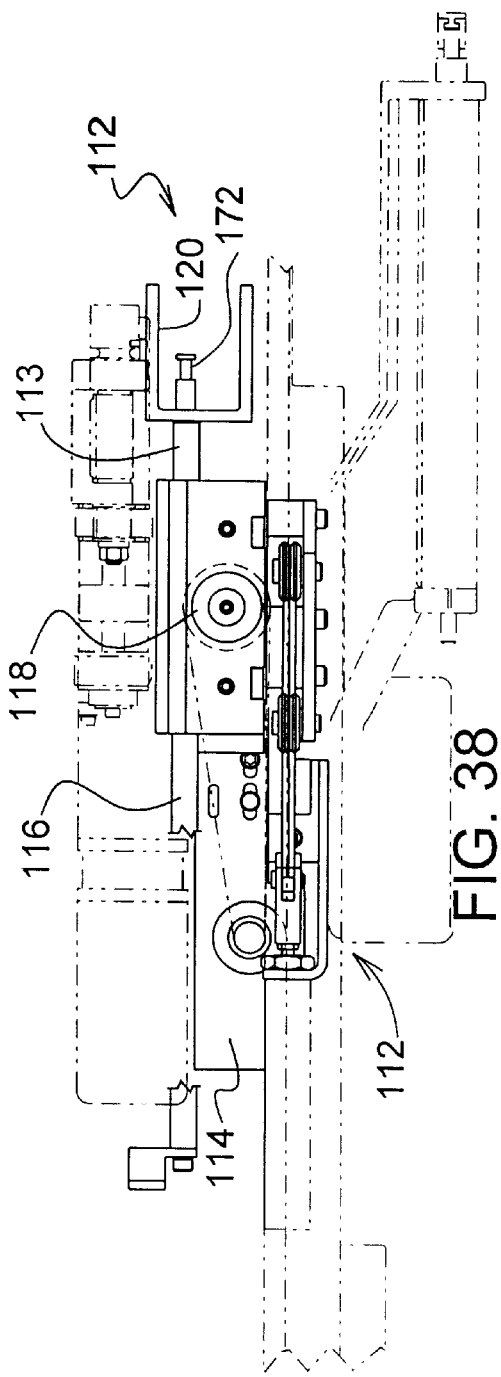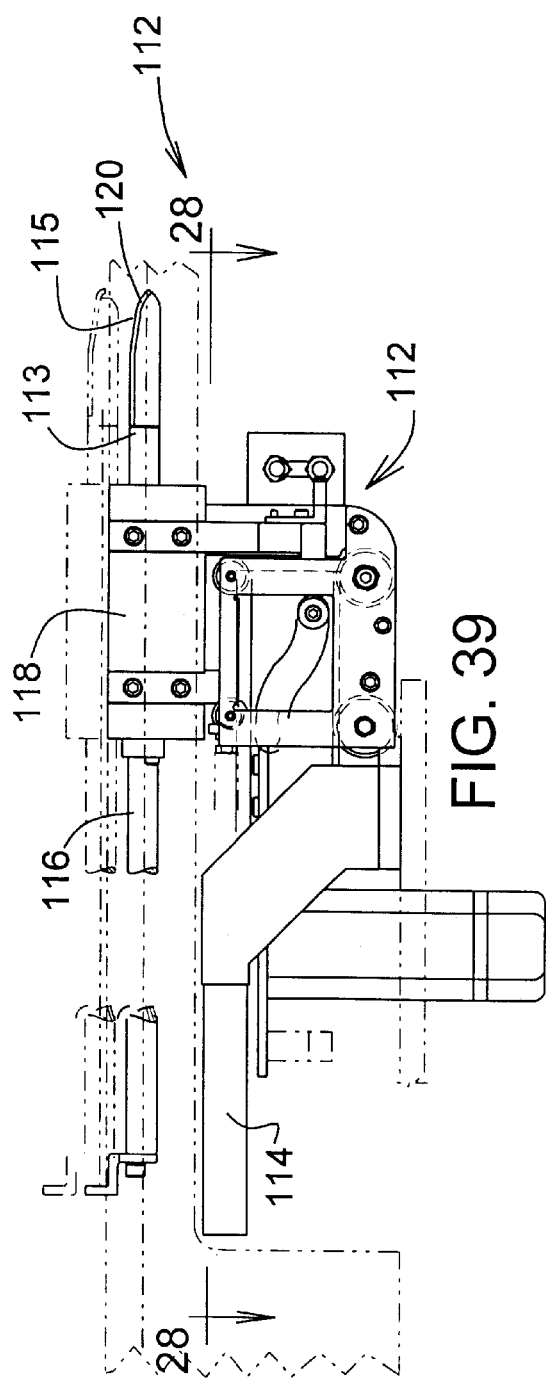

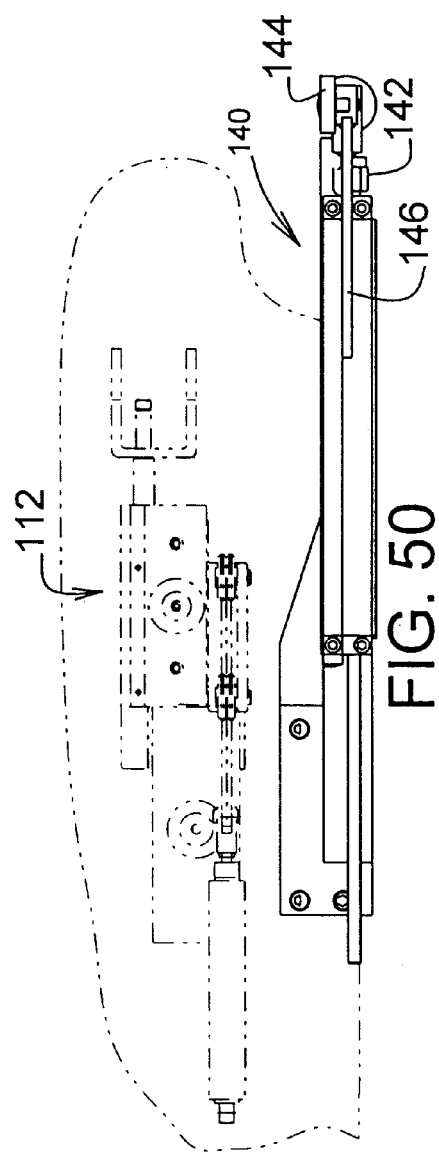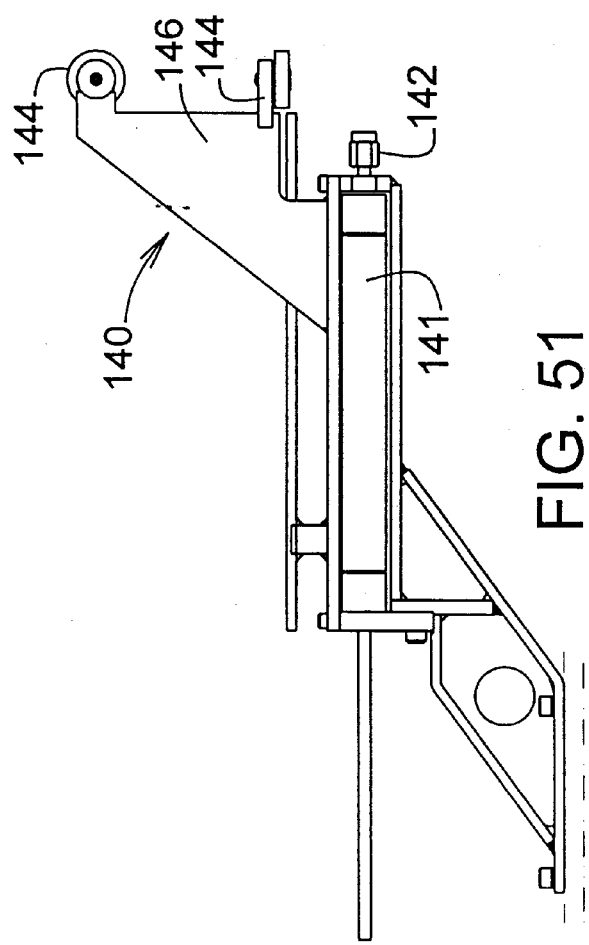

ROBOTIC CONTAINER HANDLER SYSTEM

BACKGROUND OF THE INVENTION

1. Technical Field

This invention relates to robotic parts handler system for removing containers filled with articles such as mail or packages from a high speed sorting, feeding and/or stacking apparatus and conveying the container, tray, or a cartridge for containing articles to be transported to another selected location at extremely high speeds.

2. Background Information

Articles of mail and packages are typically sorted, stacked, and conveyed by apparatus such as described in U.S. Pat. Nos. 5,634,562; 5,582,324; 5,562,195; 5,422,821; 5,201,397; all of which are incorporated by reference herein. A typical sorting and stacking apparatus is shown in FIGS. 2 and 3 consisting of a rectangular frame utilizing a plurality of receptacles and roller belt systems to convey, sort, and stack postal letters in accordance with a bar code or other indicia indicative of a particular destination. The articles are then fed into containers or boxes, whereby individuals detach the boxes upon filling, stack them on a cart, conveyor belt, or other means of moving, and transport the containers filled with mail articles to a distribution point.

The present mail distribution system is inherently inefficient in that the sorting, stacking, and conveying system is a highly automated high speed system capable of sorting and moving articles in a few seconds; however, the containers are manually carried by mail persons. Thus, the high speed equipment is frequently idle due to the inability of the mail persons to remove and replace the containers at a corresponding high rate of speed.

The present invention eliminates the necessary of mail persons to work in close proximity to the high speed operating equipment thereby eliminating the hazards associated therewith and the strenuous physical activities associated with moving the containers from the sorting apparatus to the distribution point manually. Moreover, conventional equipment utilizes a number of actuators, usually one for each mail slot or port requiring extensive maintenance and a large capital investment in equipment.

SUMMARY OF THE INVENTION

The present invention defines a robotic parts handling system having a platform forming a base including at least one linear servo magnetic motor affixed to and extending along the side beneath the platform. The platform is supported by a track including a first master rail and a second minor balancing rail. A plurality of supporting rollers supporting and hold the platform to the first master rail and the second minor balancing rail. A plurality of magnets mounted along the length of the first master rail are in cooperative magnetic engagement with the at least one linear servo magnetic motor. A plurality of positioning rollers mounted to the platform maintain a constant distance between the linear servo magnetic motor and the magnets mounted to the first master rail. A computer control unit controls and coordinates movement of the robot along the rails and the operation of the end effectors. A magnetic strip provides a means in close proximity to the rail for generating pulses readable by a reader in communication with the control unit for positioning the platform at selected positions upon the rail. A frame mounted upon the platform includes at least one pair of vertical rails spaced apart from and in alignment with one another. A pair of slide members, each one including a plurality of rollers cooperatively engage the vertical rails. A pair of timing belts provide means extending along the vertical rails in cooperative engagement with the slide members for moving the slide members up and down independently of one another along the Y-axis. A saddle having distal ends extending inbetween the vertical rails attaching to the slide members permit the saddle to be tiltable from side to side. A cylinder provides a means for tilting the saddle from front to back along the x-axis. At least one end effector mounted onto the saddle includes means for engaging and removing a container from a preselected position on one side of the platform and transferring the container to the opposite side of the platform and positioning and releasing the container in a selected location. One such means includes a conveyor having timing belts with protrusions for cooperative engagement with opposing depressions formed on the bottom of a cartridge container.

The present invention defines a high speed robotic container handling system having a digital magnetic positioning system, a platform frame having a linear servo motor thereon moveable along a pair of rails one of which includes magnets affixed thereto. The platform supports a pair of frame members supporting a tiltable saddle which supports one or more end effectors with actuators and conveyor capacity for interfacing with containers or cartridges filled with mail or the like held in multiple bins or slots on either side of the rails at selected sites up or down the track rails. In one preferred embodiment, the robotic container handling system removes containers filled with articles from the sorting apparatus, transfers and inserts them within a buffer and releasing them therein, moves to a position in alignment with the buffer containing an empty container(s) and extracts the container(s) therefrom, and inserts the container(s) into an empty location of the sorting machine; thereafter, repeating the cycle.

It is an object of the present invention to provide a robot to interface with a container, tray, or cartridge for receiving letter mail from an existing belt distribution system that guides the mail pieces into the tray at high speeds.

It is an object of the present invention to provide a robot to interface with a container, tray, or cartridge wherein the tray has an onboard lock-up means that retains the mail as the tray is used for off-system storage and/or transportation.

It is an object of the present invention to provide an end effector for manipulating the tray and interacting with the mail belt system and the tray at high speed.

It is an object of the present invention to provide a means for loading the tray containing mail onto the end effector, transport it to a position determined by an overall system controlling computer and unload the tray containing mail at a selected location at a selected time.

It is an object of the present invention to provide a conveyor module as a part of the end effector assembly which utilizes a belt having protrusions with interlock with opposing cavities and/or protrusions on the bottom surface of the tray allowing trays weighing in excess of twenty-five pounds to be handled at very high speeds and accelerations.

It is an object of the present invention to provide a robot having a platform base powered by linear servo magnetic motors providing a very high acceleration and deceleration and the ability to park the entire system consistently within at a preselected position.

It is an object of the present invention to provide a robot powered by a linear magnetic motor which is cooperatively magnetically engageable with a master rail having a plurality of permanent magnets affixed thereto together with guide rollers which maintain a necessary selected gap of about 0.020 of an inch between the motor and rail magnets in order to drive the unit back and forth in the X-axis with high speed and precision.

It is an object of the present invention for the linear motor and magnetic rail system to be adaptable with the platform of the robot for moving the robot over flat surfaces such as a floor with the aid of a second minor rail or balancing rail.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 4 is a sectional view along lines 4—4 of FIG. 2 showing the robotic handler system including effector head and platform base on a track with the effector head and conveyor assembly in the raised position in phantom lines, showing the effector head tilting and extending outwardly from the frame in phantom lines, showing support rail rollers on the top and inside of the track rail, and the linear servo motor and positioning roller on the outside of the opposing track rail;

FIG. 6 is a partial cutaway view showing the guide rollers of the platform base with the positioning guide rollers and support rollers in cooperative engagement with the master rail, showing the brake, magnets, linear servo motor, magnetic strip, and gap between the linear servo motor and positioning rollers;

FIG. 7 is a partial cutaway view of FIG. 19 showing the guide rollers, brake, and servo motor with respect to the master rail;

FIG. 26 is a top view showing the conveyor module of FIG. 24 showing the motor and belt drive of the conveyor module;

FIG. 27 is a side view of FIG. 26 showing the conveyor module with the motor and belt drive whereby protrusions of the belt are engaging the indentations of the container cartridge shown in phantom lines;

FIG. 31 is a partial sectional view of the drop gate actuator assembly taken through FIG. 33 showing the curved slide cam and rollers and the drive motor;

FIG. 32 is sectional view taken through FIG. 33 showing the drive pulleys and belt for operating the drop gate assembly;

FIG. 33 is an front end view of the drop gate actuator assembly showing the drop gate top and bottom links in the raised position and also showing them in the lowered position with phantom lines wherein the engageable mail cartridge container or tray on the end effector conveyor are also shown in phantom lines and rotated 90 degrees for viewing clarity;

FIG. 38 is a side view showing the stack support actuator with the cam track for lifting and engaging the fork rod with a receiver means extending through the bottom of a mail cartridge container;

FIG. 39 is a top view showing the stack support actuator assembly of FIG. 38 comprising a "rack and pinion" assembly wherein a fork extending from the distal end of a rod or "rack" is extendable back and forth by a pinion gear driven by a motor with a gear belt pulley and gear belt (shown in phantom lines) for driving another gear drive pulley attached to the pinion gear;

FIG. 50 is a top view of a clearing gate actuator;

FIG. 51 is a side view of the clearing gate actuator of FIG. 50;

DESCRIPTION OF THE PREFERRED EMBODIMENTS

Figure 1:
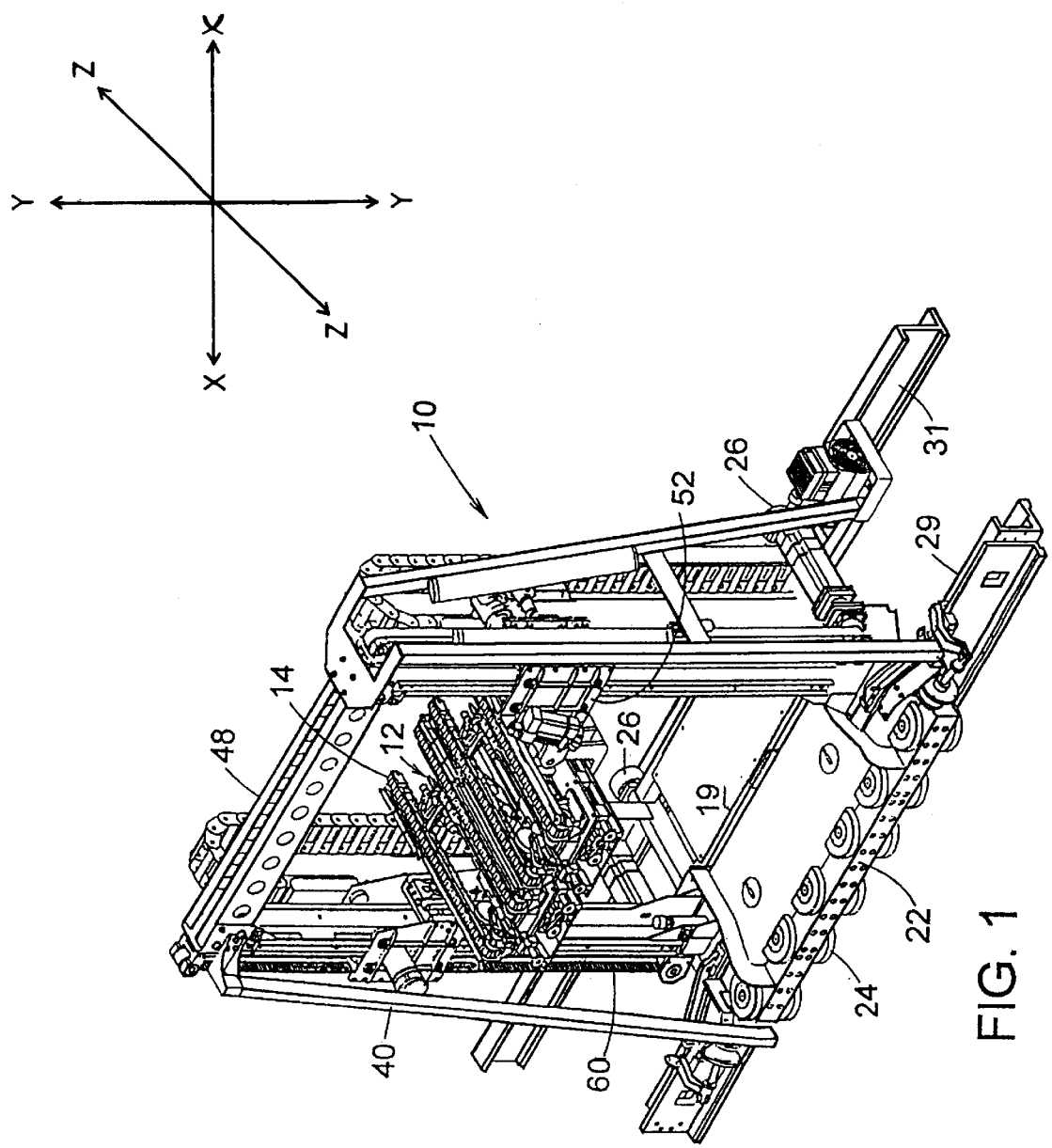
FIG. 1 is a perspective view of the robotic container handling system of the present invention.
Figure 2:
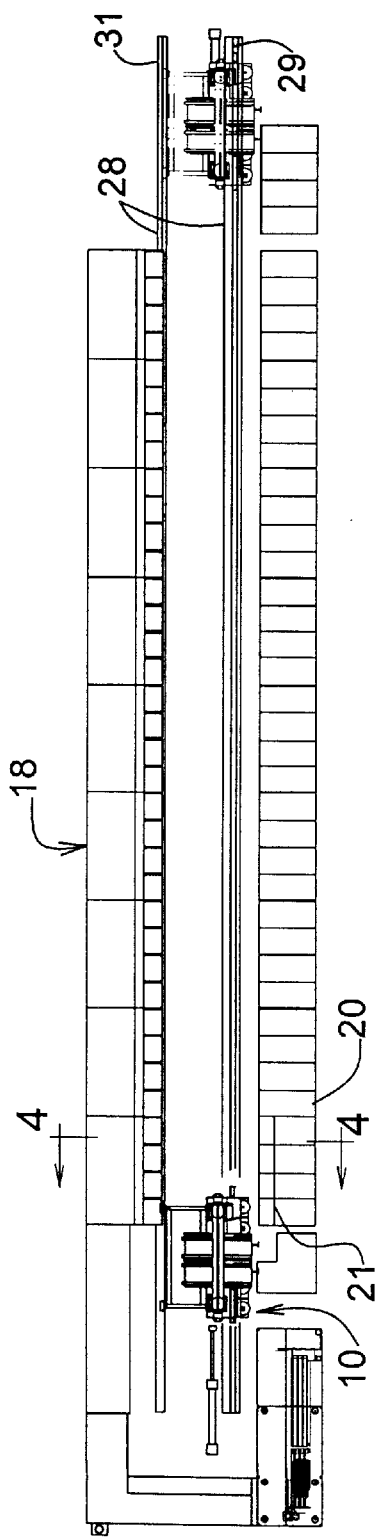
FIG. 2 is a top view showing the sorting and stacking apparatus having a platform base and end effector assembly movable upon a magnetic track rail system having a vertical lifting and stacking assembly including effector means for distributing and conveying articles.
Figure 3:
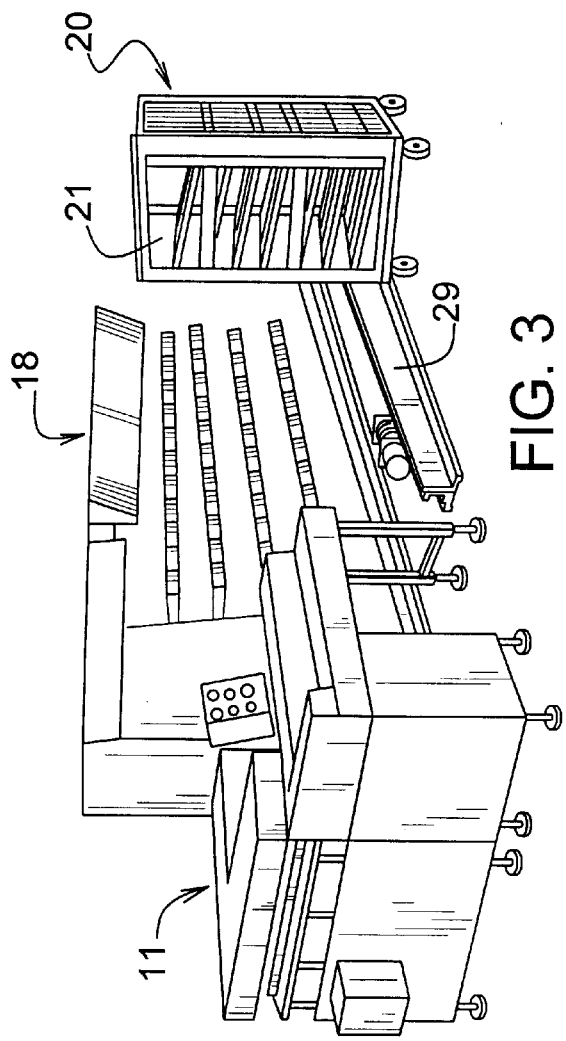
FIG. 3 is a perspective view of a computer control center for the present invention together with a mail sorting apparatus on one side of the track and a storage unit on the opposite side of the track.
Figure 5:
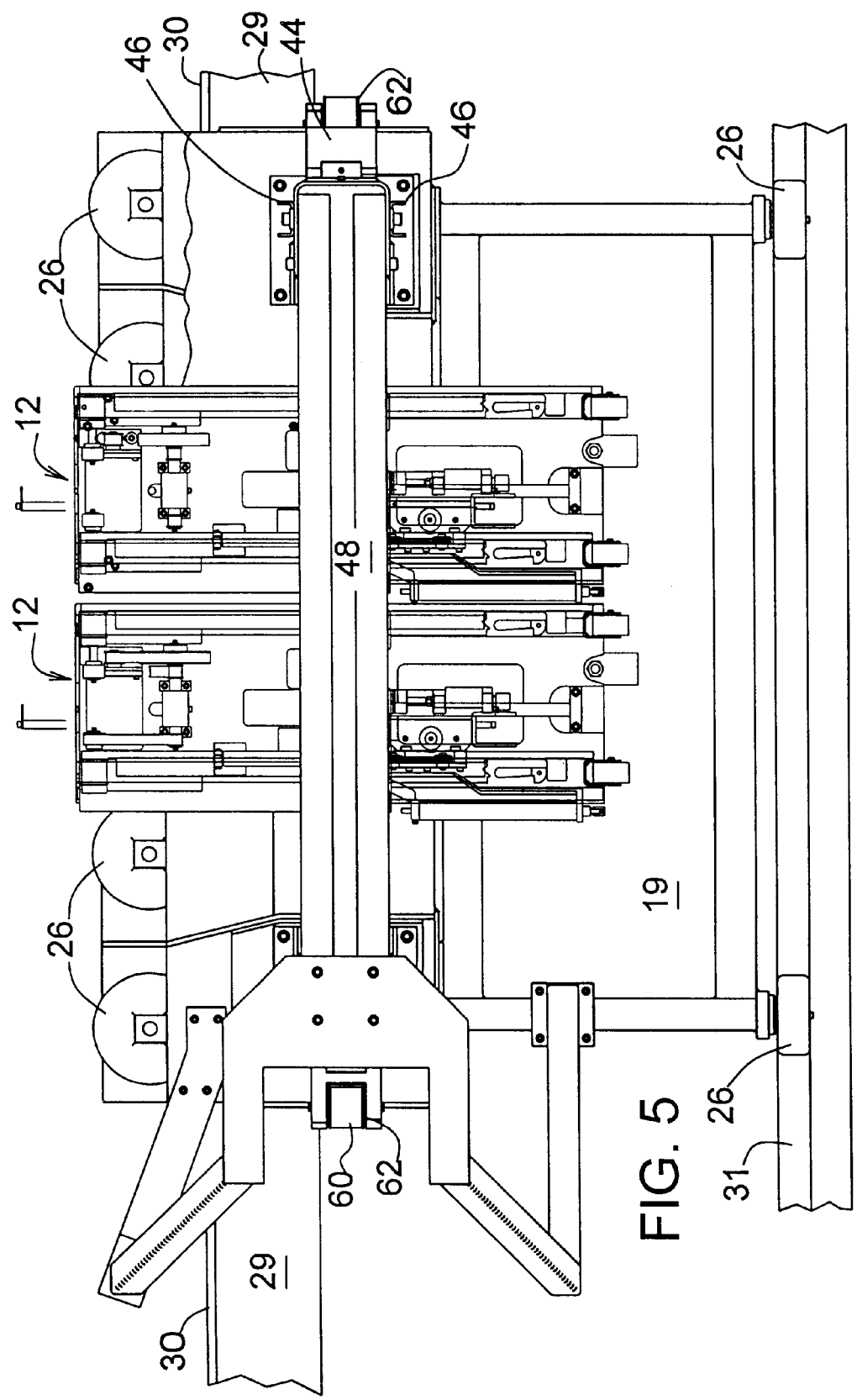
FIG. 5 is a top partial cutaway view of the robot showing a pair of effector head assemblies supported by the saddle connected to the frame by slide members held within guide rails by rollers being moved in the Y-axis by a belt all being supported by the platform base setting on a master rail showing the positioning rollers resting on the vertical portion of the master rail for holding the linear motors a selected distance from the magnetic plates affixed to the outside surface of the master rail and showing support rollers mounted onto the minor balancing support rail.
Figure 8:
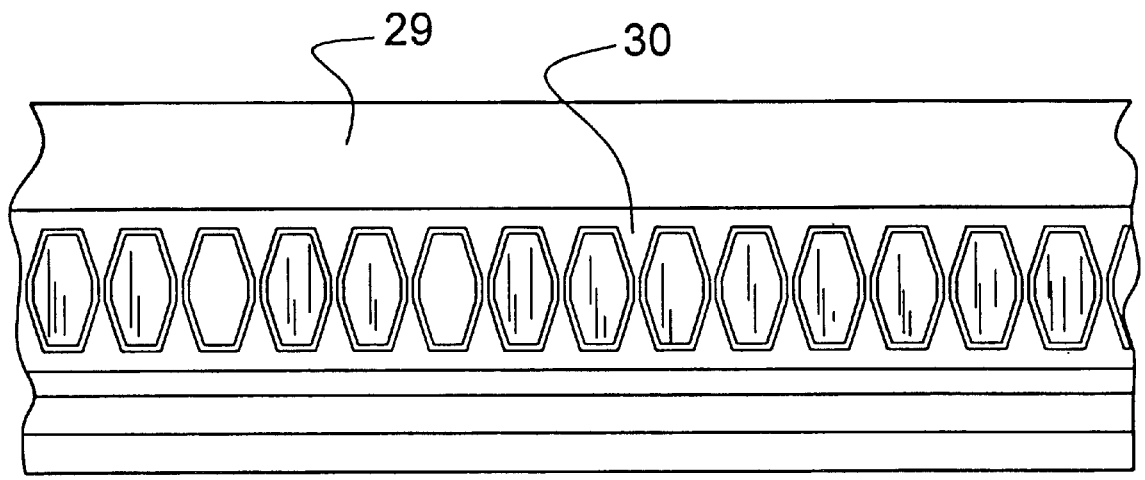
FIG. 8 is a side view showing the bank of permanent magnets attached to the master rail.
Figure 9:
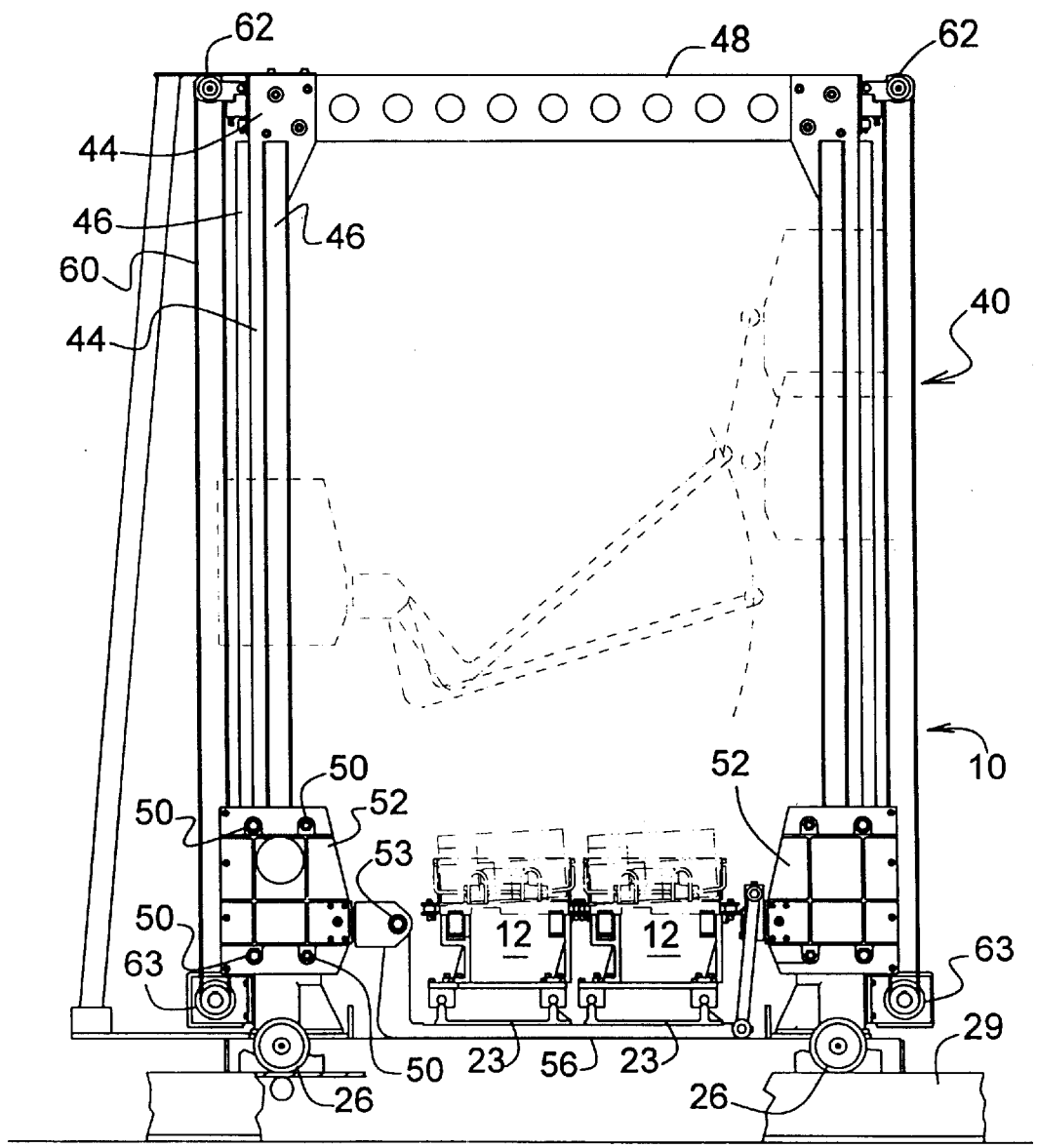
FIG. 9 is a side view showing a pair of effector head assemblies in (phantom lines) supported by the saddle connected to the frame by trunions and supported by the platform base mounted onto the magnetic rails wherein a saddle is shown in phantom lines in the raised and pivoted position.

Articles of mail and packages are typically sorted, stacked, and conveyed by apparatus such as described in U.S. Pat. Nos. 5,634,562; 5,582,324; 5,562,195; 5,422,821; 5,201,397; all of which are incorporated by reference herein. A typical mail sorting apparatus is shown in FIGS. 2 and 3. The present robotic container handling system 10 as best shown in FIG. 1, provides a means of handling the mail or other articles deposed in containers or cartridges. The present invention comprises a platform base movable upon a magnetic track or rail system having a vertical lifting and stacking assembly including effector end means for distributing and conveying articles. The distributing means consists of a effector head assembly 12 having a belt conveyor module 14, clearing gate module 15, drop gate module 17, stack support module 90, all mounted upon a cross slide module 23 to convey, sort, and stack postal letters in accordance with a bar code or other indicia indicative of a particular destinations These articles are then fed into containers, cartridges, or boxes 16. The present invention robotic container handling system, ("robot"), 10 removes the containers 16 from the sorting apparatus 18 and conveys the containers 16 filled with articles, such as letters, to a selected distribution point defining a buffer or storage unit 20 having container receivers 21 or pockets therein which engages a container or cartridge 16, such as shown best in FIGS. 27–28 and 46–49, and returns in a matter of seconds to insert the container 16 into a preselected position of the sorting apparatus 18 selected by a computer control system 11 which may be mounted piggyback onto an end of the frame 40 or be contained in a control center station with a computer, monitor, keyboard and supporting control and electrical equipment as illustrated in FIG. 3.

The robotic container handling system 18 of the present invention is manufactured from readily available materials and simple in design. The preferred embodiment is comprised of metal, more particularly stainless steel, steel, or brass; however, it is contemplated that plastic or other polymer composite materials, such as graphite fiber, nylon, or even fiberglass, could be molded and used in combination with or substituted for the steel components of the present invention.

With reference to FIG. 1, the present invention comprises a high speed robotic parts handling system 10, whereby movement of the parts handling system 10 in the X-axis is accomplished by moving a platform or base 19 supported by rubber rollers 26 which roll on a pair of rails 28. As best illustrated in FIGS. 1, 3–4, and 54, the pair of rails 28 include a first master rail 29 having a modified "I-beam configuration" including an "L-shaped member" 35 backed against a "C-shaped member" 37. More particularly, the "L-shaped member" includes defining vertical body member connecting to a horizontal leg supported by a base defining the outside portion of the rail 29. The interior portion of the master rail 29 includes a top arm extending inwardly connecting to a vertical body member supported by a horizontal leg mounted onto a base member thereby forming a channel. The minor rail 31 is a simple "I-beam" 31 provided only for stability. Of course, it is contemplated that the minor rail 31 could be replaced with another master rail 29 including magnets 30 for cooperatively engaging another linear servo motor 22 mounted to the opposing side of the platform 19. A plurality of free wheeling rollers 26 hold the platform 19 to the rails 28. In the preferred embodiment six rollers 26 are mounted along the sides of the platform 19 to roll on top of the rails 28 and two rollers 26 are mounted laterally to the platform providing lateral support thereto. The robot 10 and its payload are supported by anti-friction bearings. Furthermore, a plurality of positioning rollers are used to maintain a constant distance between the faces of the linear servo motors 22 mounted onto the moving platform 19 and continuous magnet panels or plates 30 mounted to the master guide rail 29. In the preferred embodiment, twelve positioning rollers 24 are mounted onto a longitudinal support member 13 having a generally square cross-sectional shape and which extends along one side of the base 19. The positioning rollers or guide wheels 24 are used to separate and hold the linear servo motors 22 away from the magnets 30 positioned alone the master rail 29 a selected distance. As best shown in FIGS. 1, 4, 5–7, the positioning rollers 24 contact the master rail 29 at points above and below the magnet plates 30 which are located thereinbetween. The positioning rollers 24 have the hub and inner wheel portion fabricated from aluminum and an outer periphery band is fabricated from stainless steel; however, it is contemplated that other materials such as graphite, other polymers, or even ceramic material could be used to fabricate the positioning rollers 24. Using accurately sized positioning rollers 24 rolling upon the vertical sides of the master rail 29 provides a means for selecting and accurately maintaining a precise distance between the rail mounted magnets 30 and the linear servo motors 22 mounted to the platform 19 of the robot 10.

The platform is powered by at least one and preferably a pair of brushless linear servo motors 22 and permanent magnets 30 mounted on edge to the side of the rail 28 whereby the faces of the motor(s) 22 and magnets 30 are perpendicular to the platform surface 19 and the supporting surface of the rails 28. Thus, linear motor is mounted 22 vertically to the track rail 28 allowing for the use of a single master rail for both robot support and propulsion.

The linear motors 22 and magnets 30 provide a means to accelerate, propel, and stop the payload platform 19 at precise locations along the horizontal rail 28.

Figure 19:
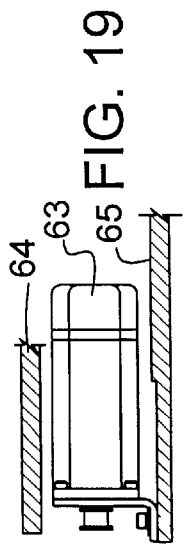
FIG. 19 is a sectional view of FIG. 18 showing the motor drive of the cross slide module.
Figure 20:
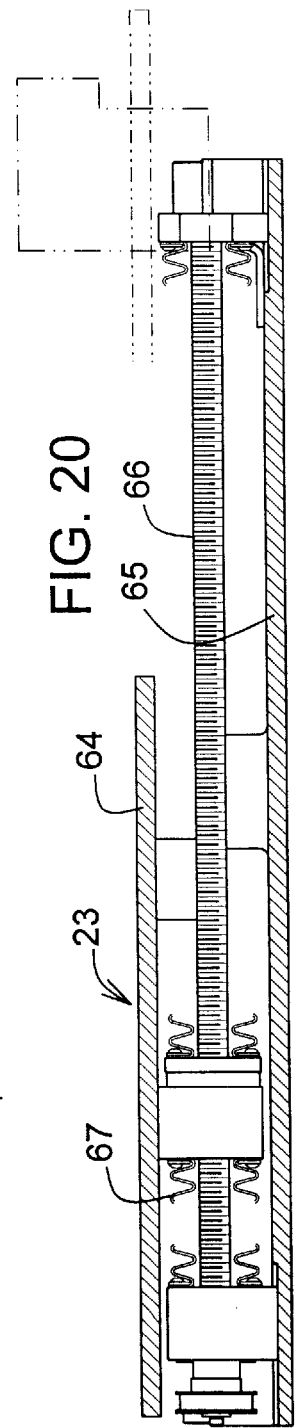
FIG. 20 shows a sectional view of a the cross slide module of FIG. 18 showing a portion of the servo driven ball screw assembly.
Figure 21:
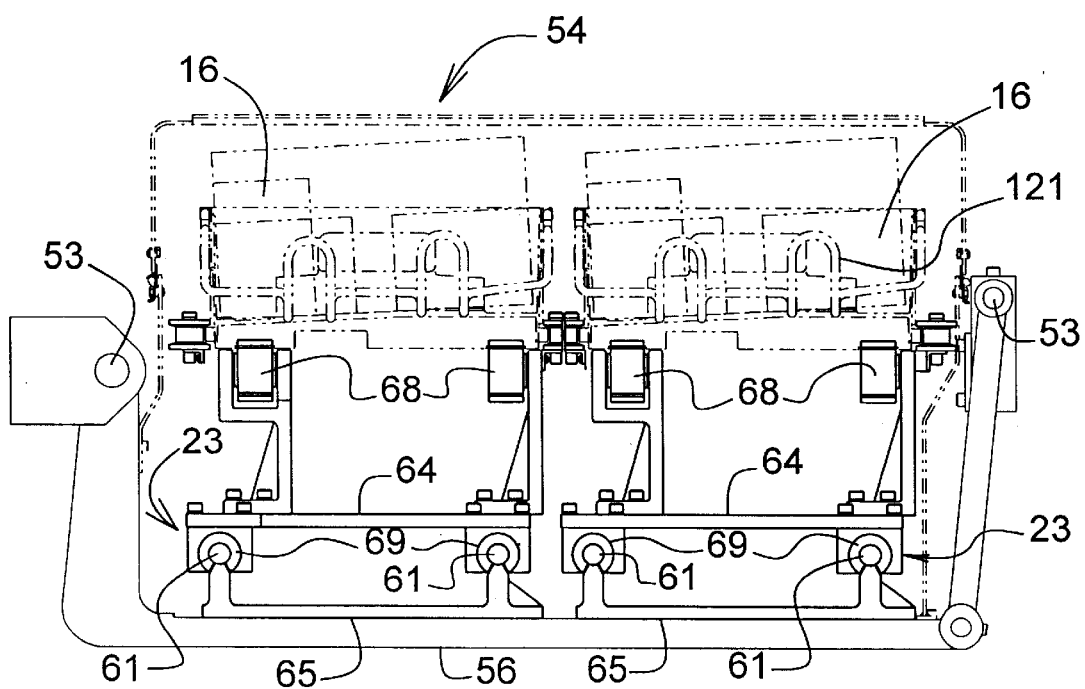
FIG. 21 is a rear end view showing a saddle supporting a pair of cross slide modules having conveyor modules mounted thereon with a pair of container cartridge trays shown in phantom lines supported thereon.
Figure 22:
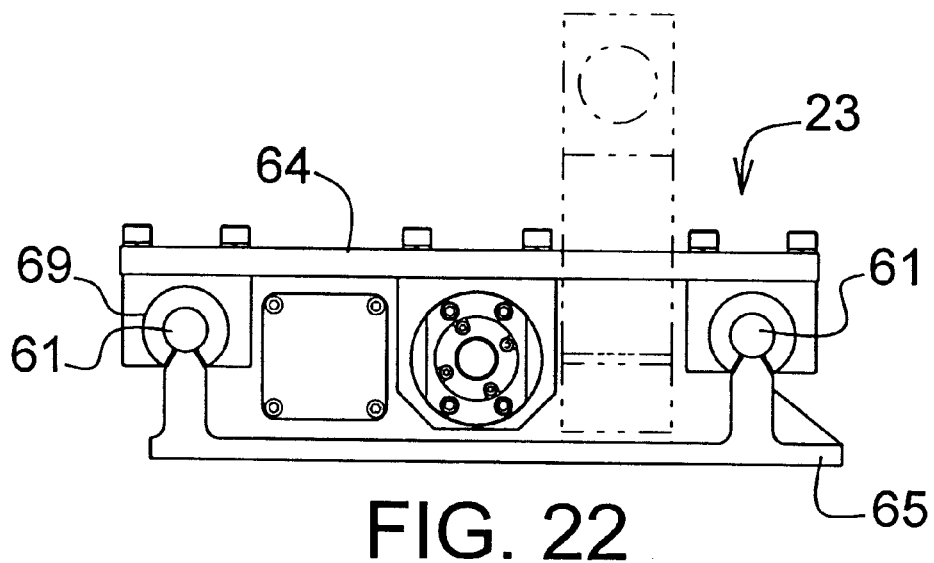
FIG. 22 is a front end view of the cross slide module showing the ball screw and slide rods that move the cross slide saddle back and forth on the cross slide base.
Figure 23:
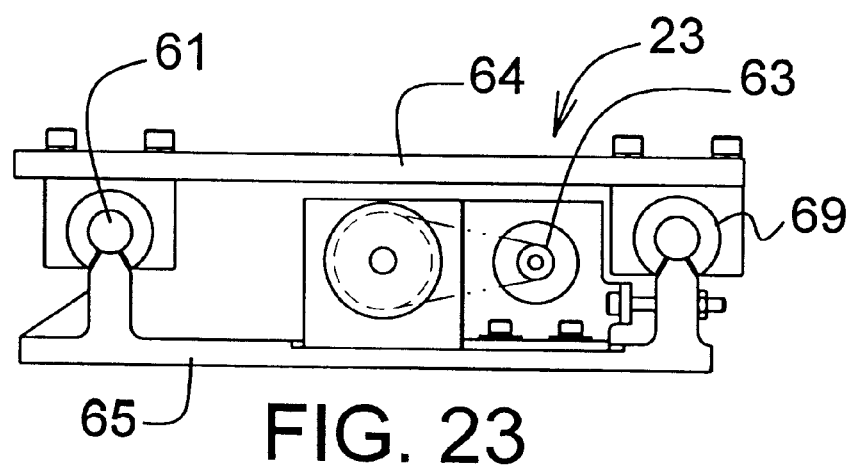
FIG. 23 is a rear end view of the cross slide module showing the motor and drive train for moving the cross slide saddle back and forth over the slide rods mounted on the cross slide base.
Figure 24:
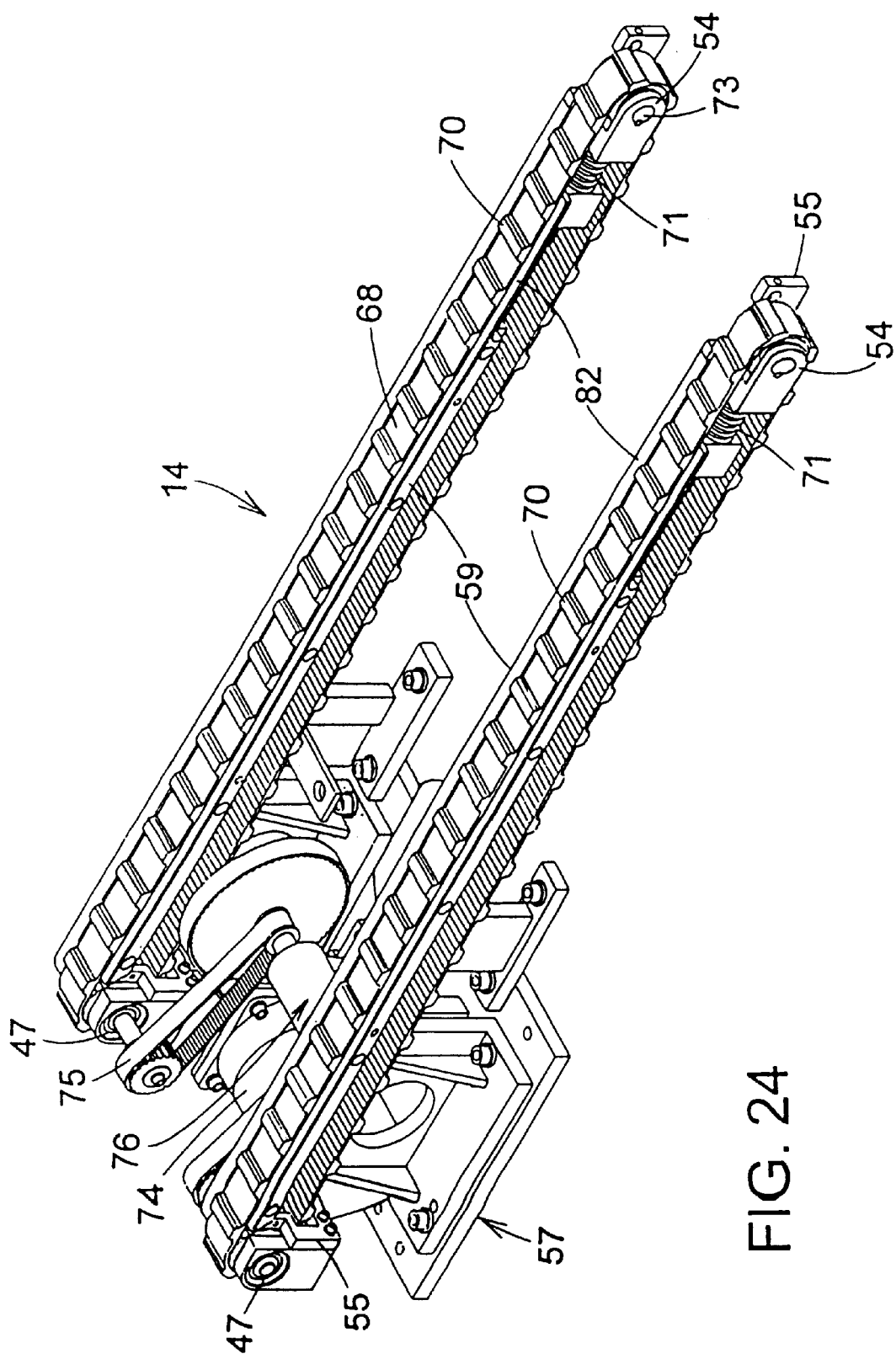
FIG. 24 is a front end perspective view of a conveyor module of the effector head assembly.
Figure 25:
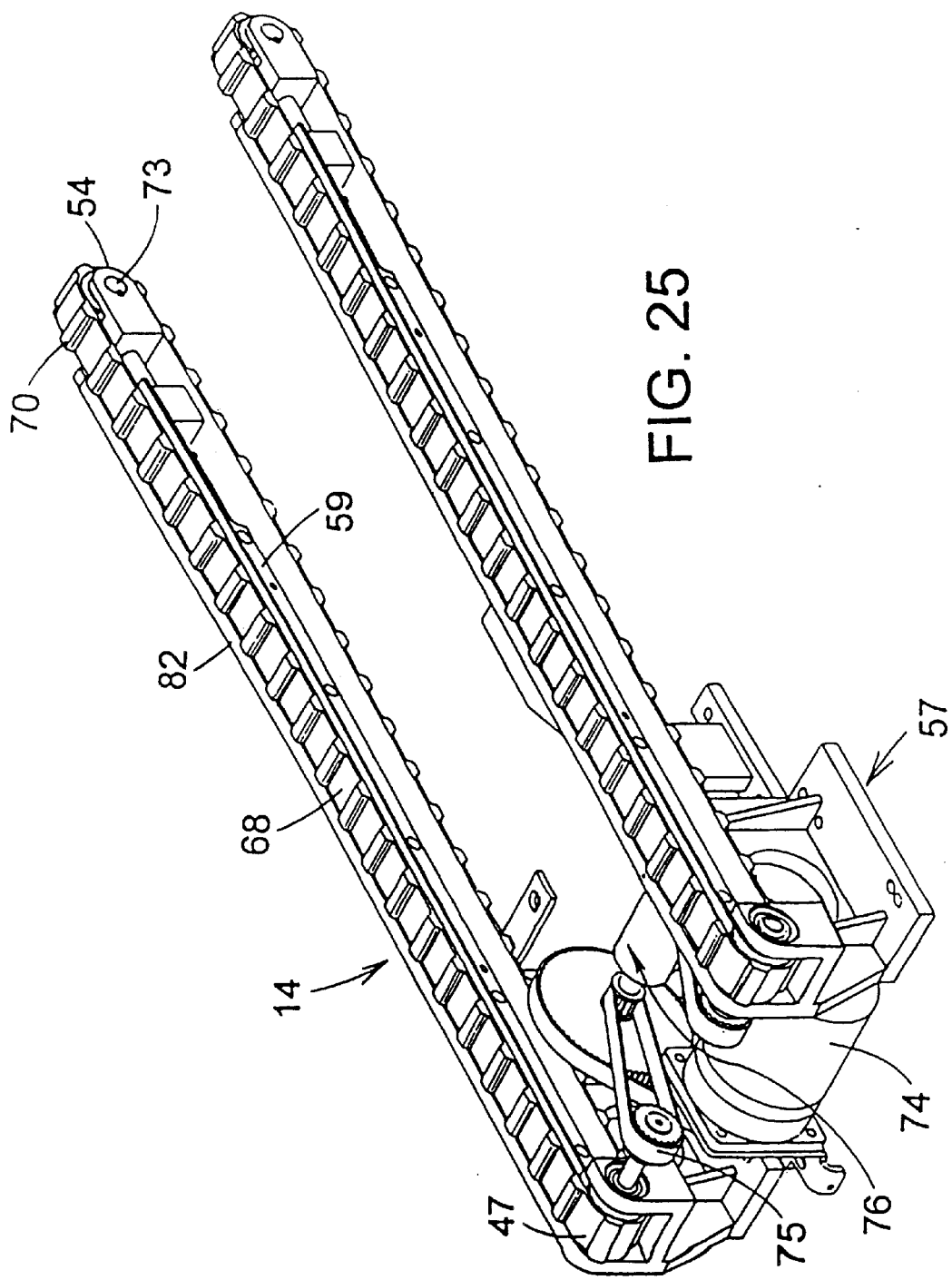
FIG. 25 is a rear end perspective view of the conveyor module of FIG. 24.
Figure 28:
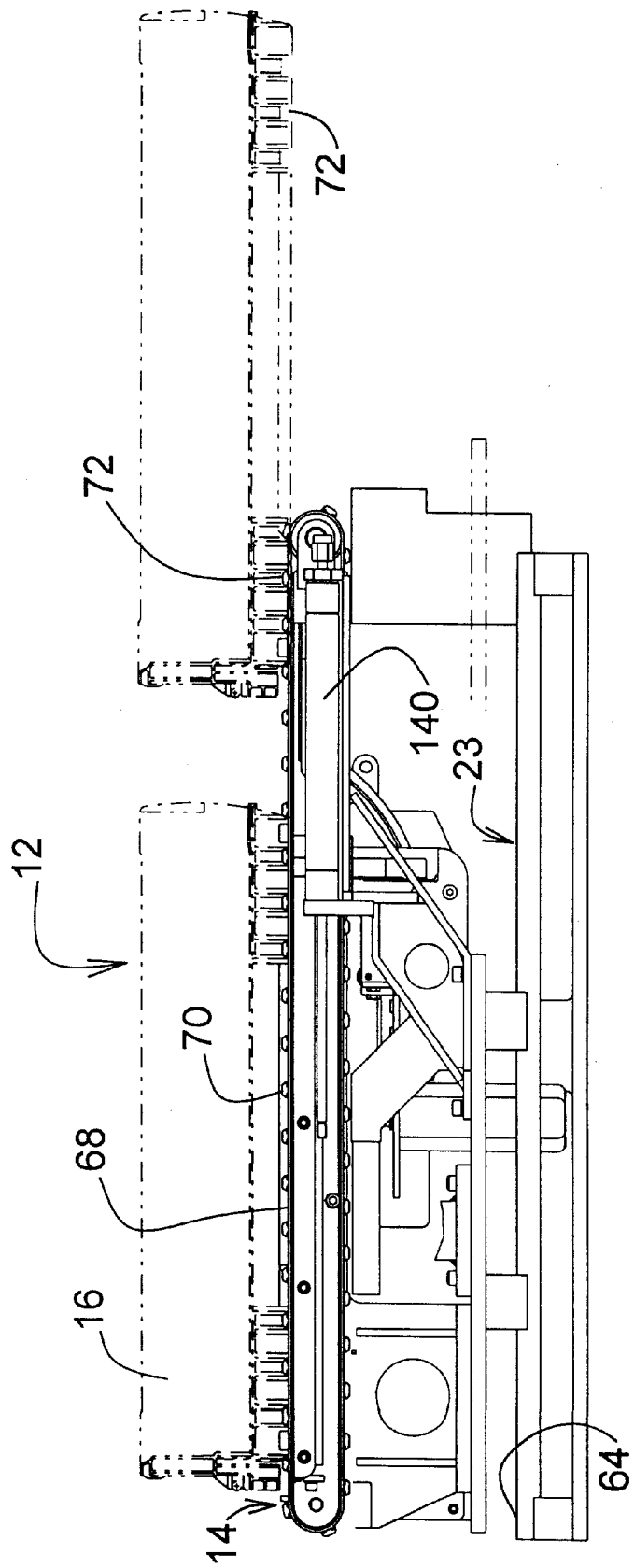
FIG. 28 is a side view showing a cross slide module supporting the conveyor module including a container cartridge whereby protrusions of the belt are engaging the indentations of the container cartridge shown in phantom lines.

The rails 28 having a magnet bank 30 of permanent magnet plates extending therealong as shown in the FIGS. 4–8 More particularly, the linear servo motors 22 are mounted in tandem for providing a magnetic positioning system whereby the platform 19 is suspended by a plurality of rail rollers 26 supported and guided upon rails 28. A plurality of magnets 30 may be abutted together as longitudinal plates and affixed to the rail 28 depending upon the desired length of the track. In the preferred embodiment the magnets are attached to the outer vertical portion of the rail; however, it is contemplated that the magnets 30 could be affixed to the inside of the rail or a separate strip of longitudinal material in close proximity thereto. The thickness of the magnet plates is dependent upon the magnetic force required for the linear motor(s) selected, and the length and width of the magnetic plates 30, but it is preferably less than one inch thick, more preferably less than one-half inch thick, and most preferably from about 0.35 to about 0.50 inches thick. As best shown in FIGS. 2 and 19, a gap 25 of approximately 0.020th of an inch gap exists between the motor 22 and the rail 28. The strong attraction between the motor(s) 22 and magnets 30 allow the motors 22 (and platform 19) to follow a slightly irregular track path if required. Moreover, the unique arrangement allows clearing debris which could foul the running clearance necessary for motor efficiency.

A thin magnetic tape indicator strip 32 extends along the inner surface of at least one of the rails 28 includes magnetized graduations 36 which generate pulses readable by the a reader in communication with the control unit for the robot 10 as it moves along the rails 28.

Movement is accomplished by interaction of the linear motors 22 with the magnets 30 based upon the Hall effect, whereby a transverse electric field is developed in a current-carrying conductor placed in a magnetic field. Ordinarily the conductor is positioned so that the magnetic field is perpendicular to the direction of current flow and the electric field is perpendicular to both. The high magnetic attraction between the coil assembly of the linear servo motors 22 and magnet plates is very effective for preloading heavy-duty bearings commonly used in high force applications such as the closed loop servo performance required for the instant invention.

Figure 10:
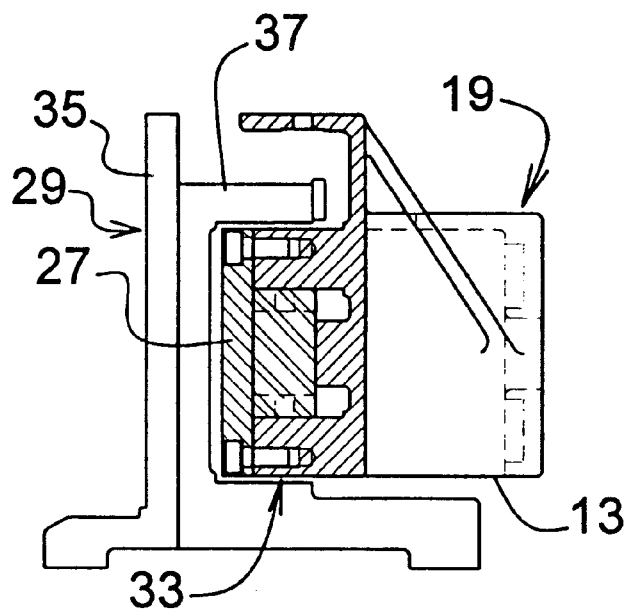
FIG. 10 is a top sectional view showing the of a rail in cooperative engagement with the rail brake in the open unlocked position.
Figure 11:
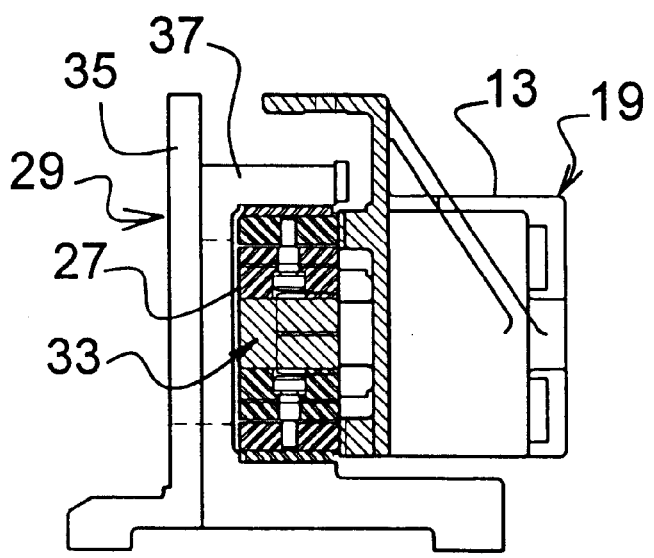
FIG. 11 is a top sectional view of the brake of FIG. 6 in cooperative engagement with the rail brake in the closed locked position.
Figure 12:
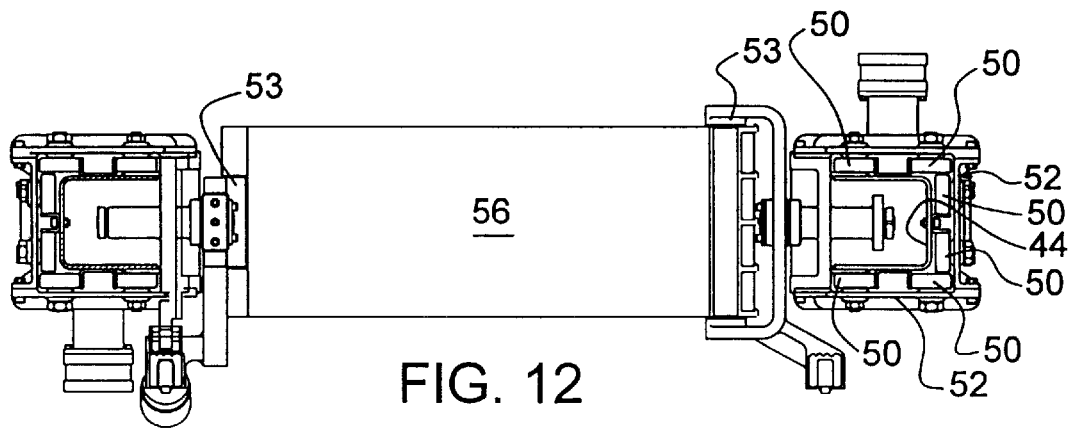
FIG. 12 is a top view of the tiltable saddle supported by vertical support columns and movable up and down by rollers cooperatively engaging the vertical columns by trunions and powered by rotary servo motors.
Figure 13:
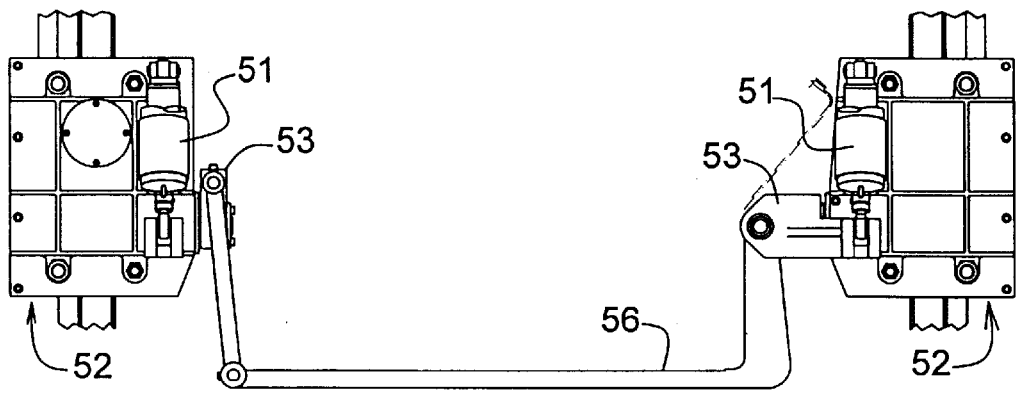
FIG. 13 is a side view of the tiltable saddle of FIG. 12 and the vertical support columns showing the saddle connected to the columns by trunions and showing a pair of rotary servo motors for raising and lowering each side of the saddle independently.
Figure 14:
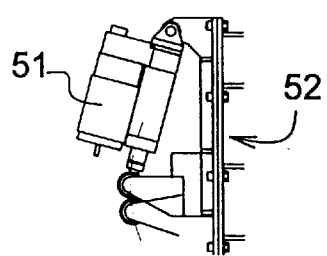
FIG. 14 is a side view of the cylinder shown in FIGS. 12 and 13 used for tilting the saddle forward or rearward.

As shown in FIGS. 10–11, at least one fail safety brake 29 is attached to the platform 19 having a brake shoe 27 held in the "on" position by springs to bear against the inside one of more of the rails 28, wherein the brake shoe 27 is spaced apart from the rail 28 and held in the release "open" position by air pressure supplied to the actuators of the robot 10, so that failure of the air pressure permits the shoes to contact the guide rail 28 stopping the motion of the platform 19 in case of an emergency.

Movement along the Y-axis is accomplished by having at least one end effector assembly 12 mounted on a cross slide module 23 attached to a support saddle 56 pivotally mounted between a pair of trunions 53 suspended by a pair of slide members 52 cooperatively engaging a timing belt 62 reciprocating up and down vertical rails 46 mounted to a vertical column 44 extending upward from the platform 19 and being supported by an "A-frame" 40 mounted upon the platform 19. More particularly, as illustrated in FIGS. 1, 4–5, 9, 12–15, and 44–45, the "A-frame" or frame 40 includes a pair of spaced apart vertical support columns 44 extending upward from the base 19. Three vertical guide rails 46 are attached to and extend along each support column 44 on the sides and outer surfaces thereof. The support columns 44 are connected together at the top end by a horizontal truss member 48. A plurality of twelve guide rollers 50 move in cooperative engagement along the surface of the frame guide rails 46 in the Y-axis.

The support column 44 having three guide rails 46 includes guide rolls 50 in cooperative communication therewith extending from the interior side of a pair of aluminum slide members 52. The slide members 52 consist of a back and sides plates attached forming a "U-shaped" slide member 52. The guide rolls 50 positioned on each side of the rail 46 slidably hold the slide member 52 to the guide rails 46. The slide members 52 have a pair of trunions 53 projecting inwardly therefrom connecting to the distal ends of an end effector support saddle 56 which support one or more end effectors assemblies 12 which pick up, convey, position, and release the containers or cartridges 16. The saddle 56 defines a substantially flat base having upwardly extending arms in cooperative engagement with the trunions 53 providing for movement in tilting the saddle 56 along the X-axis in the Y direction "side to side", so the saddle is 56 higher with respect to one side of the vertical support columns 44 than the other and utilizing hydraulic, air cylinders, or ball screw actuator (electric cylinder) 51 for tilting the saddle 56 pivoting around the X-axis providing a means to cooperatively engage the upper containers of the mail sorting apparatus and providing a means for engaging the receiver 21 of the buffer 20 which are formed having a downward angle of about 10 degrees in order to hold the containers 16 in position by gravity during transfer from the receiving point to the distribution point.

A means for attaching a steel and KEVLAR reinforced urethane timing belt 60 having a plurality of spaced apart projections extending therefrom is attached to an exterior side of each of the slide members 52 and extends around a pulley 62 mounted to the top of a column 44 and driven by a motor 63 mounted to the bottom of the column 44 for moving the slide member along the vertical guide rails 46 at a high rate of speed.

Figure 15:
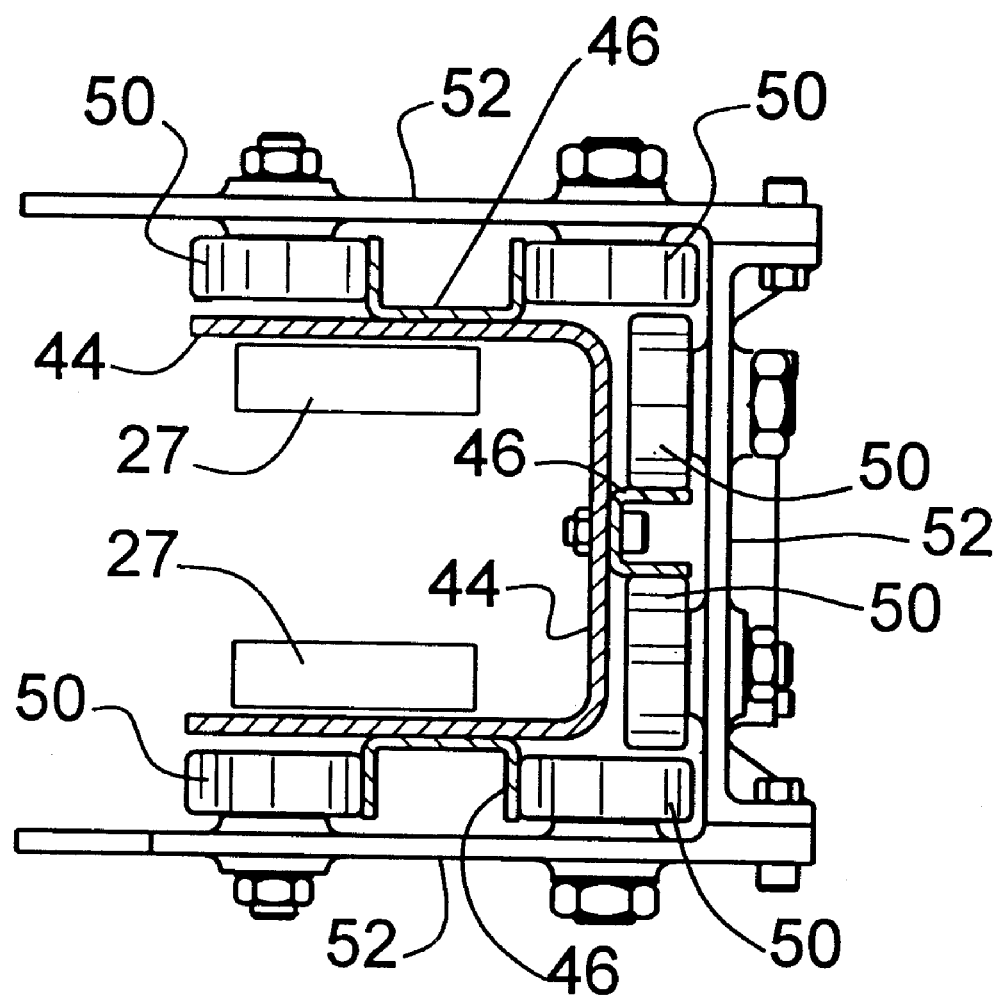
FIG. 15 shows a top view of the guide rollers mounted onto the saddle trunion supporting the end effector for sliding up and down the guide rails mounted to the vertical support rails of the frame having a pair of opposing fail safe brake pads extending against the interior surface of the support column to stop vertical motion of the assembly upon loss of power.
Figure 16:
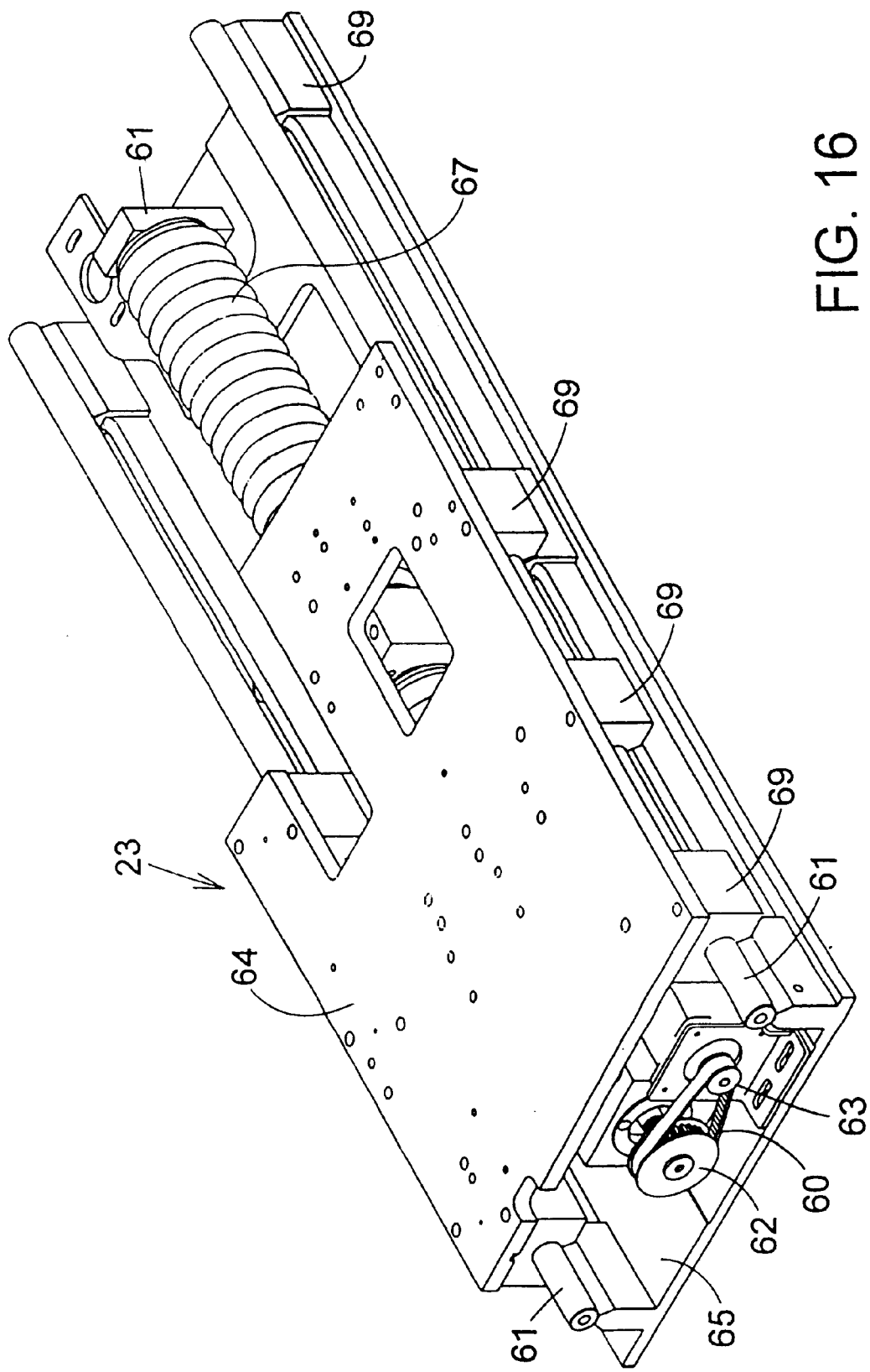
FIG. 16 is a perspective rear end view of a cross slide module of the present invention showing the cross slide saddle, base, rails, drive pulley, timing belt, pillow block, and drive motor.
Figure 17:
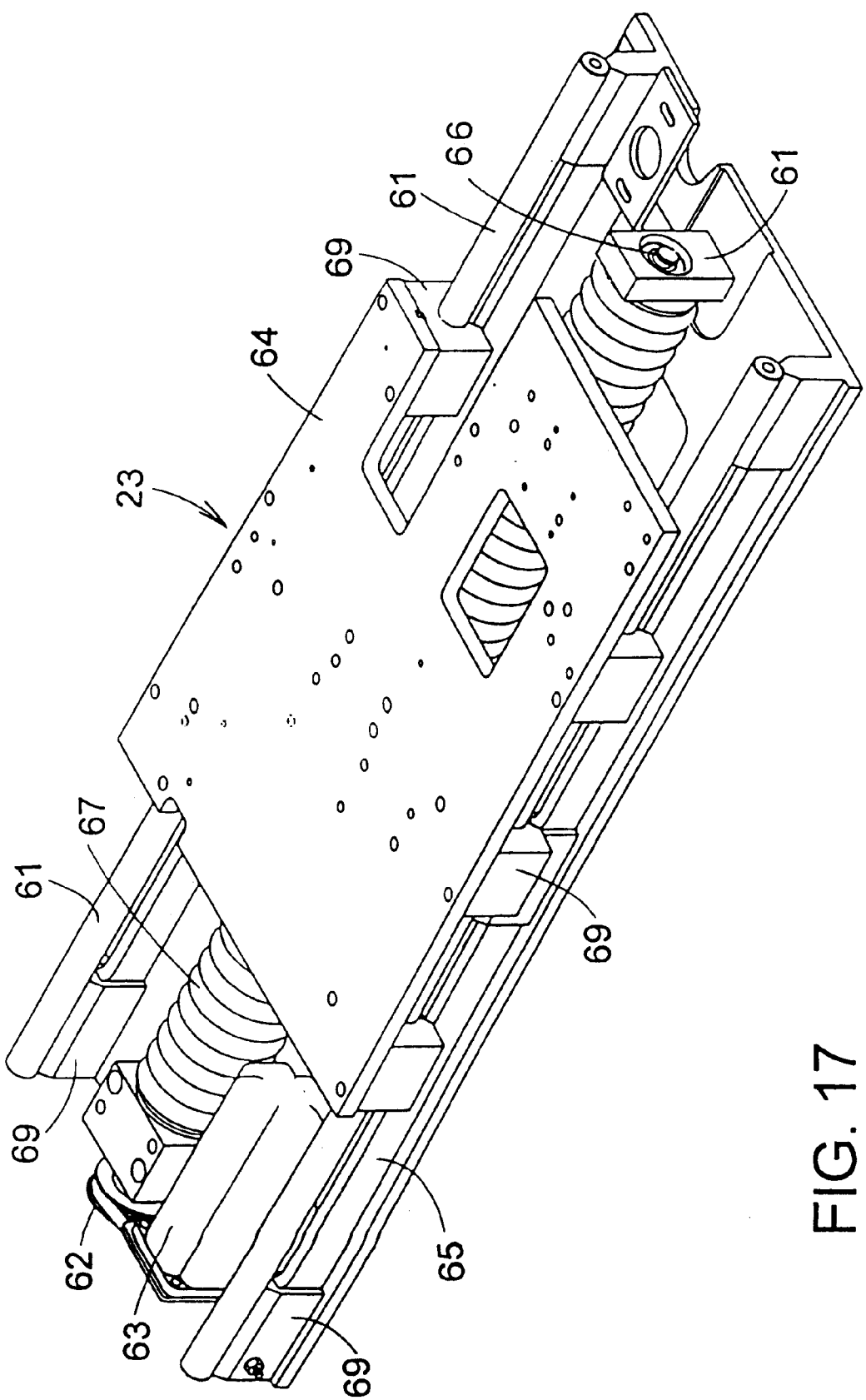
FIG. 17 is a perspective front end view of the cross slide module of FIG. 16 showing the ball screw, ball screw cover, and ball screw support bearing housing.
Figure 18:
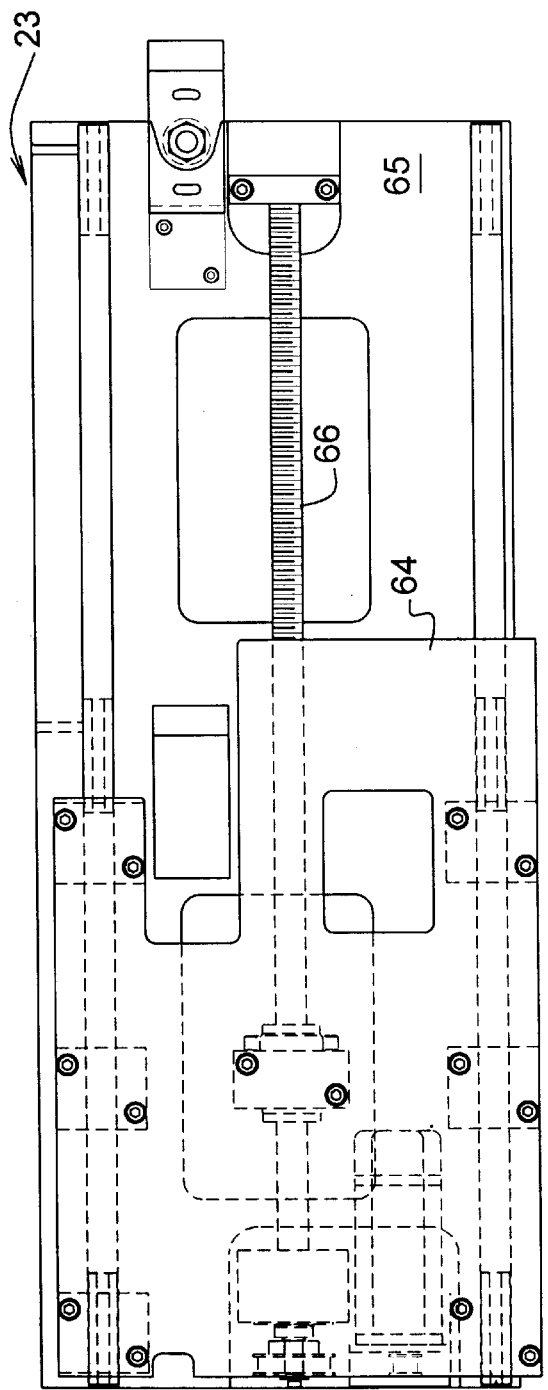
FIG. 18 is a top view of FIG. 16 showing the cross slide module.

At least one and preferably more end effectors 12 are mounted onto the platform 19 providing a means of elevating and maneuvering a container or cartridge thereon. FIG. 15 shows a top view of the guide rollers 50 mounted onto the saddle trunion 53 supporting the end effector 12 for sliding up and down the guide rails 46 mounted to the vertical support 44 of the frame 40 having a pair of opposing fail safe brake pads 27 extending against the interior surface of the support column to stop vertical motion of the assembly upon loss of power.

A fail safety brake 29 is also attached to each slide member 52 having a brake shoe 27 in the "on" position to bear against the inside of the support column 44, wherein the brake shoe 27 is spaced apart from the guide rail 46 and held in the release "open" position by air pressure supplied to the actuators of the robot 10, so that failure of the air pressure permits the shoes 27 to contact the column 44 stopping motion of the slide member 52 in the vertical direction in case of an emergency.

As best illustrated in FIGS. 16–23, each end effector conveyor 14 is supported by a cross slide module 23 mounted onto the saddle 56 normal thereto. At least one end effector assembly 12, and preferably more than one end effector assembly 12 is mounted onto the cross slide module 23 supported by a saddle 56.

The cross slide module 23 includes a cross slide base 65 having a pair of rods or rails 61 mounted thereon slidably engaging corresponding linear ball bearings 69 within which support a cross slide mounting platform 64. The mounting platform 64 is moved back and forth with respect to the cross slide 23 in the Z-axis with respect to the platform 19 by means of a servo driven ball screw 66 enclosed within a rubber bellows 67 ending in a ball screw support bearing housing 61 and powered by a drive pulley 62 connected to a servo motor 63 by a belt 60.

Mounted onto the cross slide module 23 of the end effector head assembly 12 perpendicular to the end effector support saddle 56 is at least one and preferably two or more conveyor modules 14 as shown best in FIGS. 24–29 for interfacing with the container (cartridges) 16. Each conveyor module 14 includes a frame 57 mounted onto the cross slide module 23 which supports a pair of conveyor rails 59 having a drive end pulley 47 and distal end pulley 54. A belt guide projection 55 is located in front of the drive end pulley 47 and pass the distal end pulleys 54. A spring 71 attached to the rail 59 biases against the conveyor take up end axle 73 of the distal end pulley 54 to maintain selected tension on the conveyor belt 68. The conveyor belts 68 are driven by a servo motor 74 through a timing belt reduction drive 76 which engages a first set of drive pulleys 47 which are connected by the belt 68 to the set of idler pulleys 54. A polyethylene slide plate 82 which rests upon an aluminum frame rails 59 supported by the frame 57 mounted to the cross slide saddle 64. A pair of conveyor belts 68 fabricated of steel and KEVLAR reinforced urethane are driven by a timing belt 75 in communication with the drive end pulleys 47 and a servo motor 74 mounted to the frame 57. It is contemplated a single belt fabricated from different material could be substituted for the belt 68 of the preferred embodiment. Moreover, the conveyor belt 68 of the preferred embodiment includes a plurality of spatial profiles or cleats 70 extending or projecting therefrom for positive cooperative communication with corresponding indentations 72, molded into the bottom of the container (cartridge) 16.

As best shown in FIGS. 29–34, a drop gate actuator assembly 90 comprises a support frame member 92 generally centrally mounted onto the cross slide module 23 inbetween the conveyor belts 68 and near the distal end of the conveyor belts 68 for engaging the drop gate of the container (cartridge) 16 held within the storage cart or slot of the sorting apparatus 18. The entire drop gate actuator assembly 90 extends above the cross slide module 23, but below the conveyor belts 68 and the pass line of the container 16 passing thereover.

A drop gate actuator motor 91 is mounted onto a support frame member 92 mounted onto the cross slide module 23. Extending from the servo motor 91 is a shaft having a pulley 93 mounted thereon. The pulley drives a first timing belt 106 extending upward to a first drop gate pulley 102 attached to the a drive shaft 94 held by the inward end of the support frame member 92 in alignment with the drive shaft 94. A second drop gate pulley 104 of a lesser diameter, preferably ½ the diameter of the first drop gate pulley 102, is attached to the shaft 94. A first drop gate link arm 96 is rigidly mounted to the shaft 94 extending at a selected angle therefrom. A second drop gate top link arm 98 is pivotally connected to the distal end of the first drop gate link arm 96 by a shaft 97 allowing rotation thereof from 0 to 180 degrees providing the second drop gate top link arm 98 to extend in a straight line or pivot back upon the first drop gate link arm 96. The shaft 97 controlling the movement of drop gate arm 98 is rotatably held by a portion of the frame 92 in alignment with shaft 94. An upper drop link control pulley 103 extending from the inward end of shaft 97 is in cooperative engagement with the pulley 104 and driven by timing belt 106. Rotation of the upper control link pulley 103 by rotation of the timing belt 166 rotates the drop gate top link 98 effectively raising or lowering the distal end 100 of the drop gate top link arm 98 allowing movement in a vertical straight line and in vertical alignment with the drive shaft 94. The ability for the distal 100 of the second drop link top arm 98 to move vertically develops the straight line motion required for alignment and engagement of the drop gate 132 of the container (cartridge) 16. The means for engagement of the drop gate 132, as shown in the preferred embodiment, is a socket 107 having a notch 108 therein extending normal from the front end of the distal end portion 100 of the second top link arm 98. A tension means such as a spring 105 retains the socket 107 so that the notch 108 is in vertical alignment for engagement of the drop gate rod 132 of the container 16.

Figure 29:
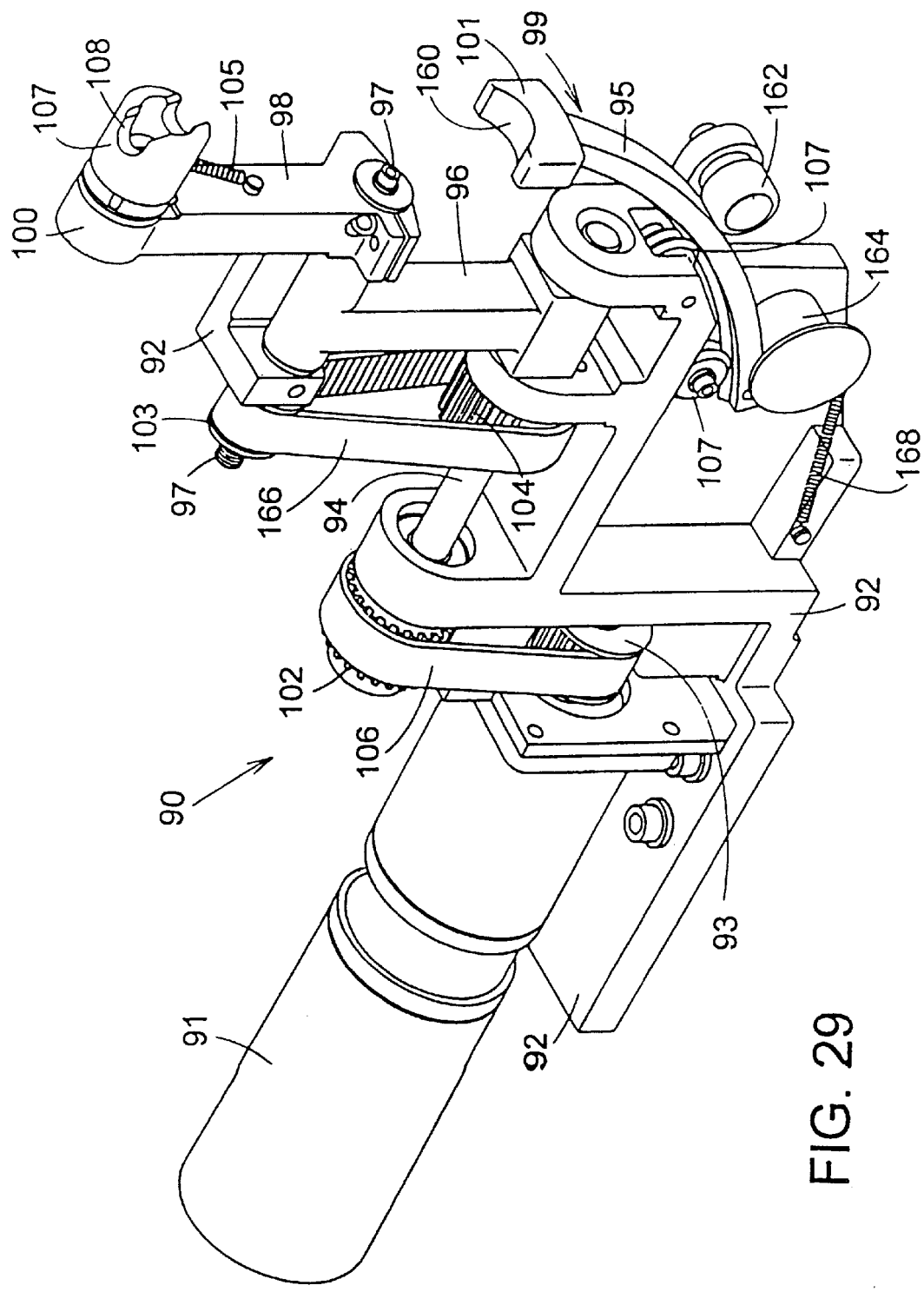
FIG. 29 is a rear perspective view of the drop gate actuator which mounts to the cross slide module of the effector end assembly showing the drop gate actuator in the down position.
Figure 30:
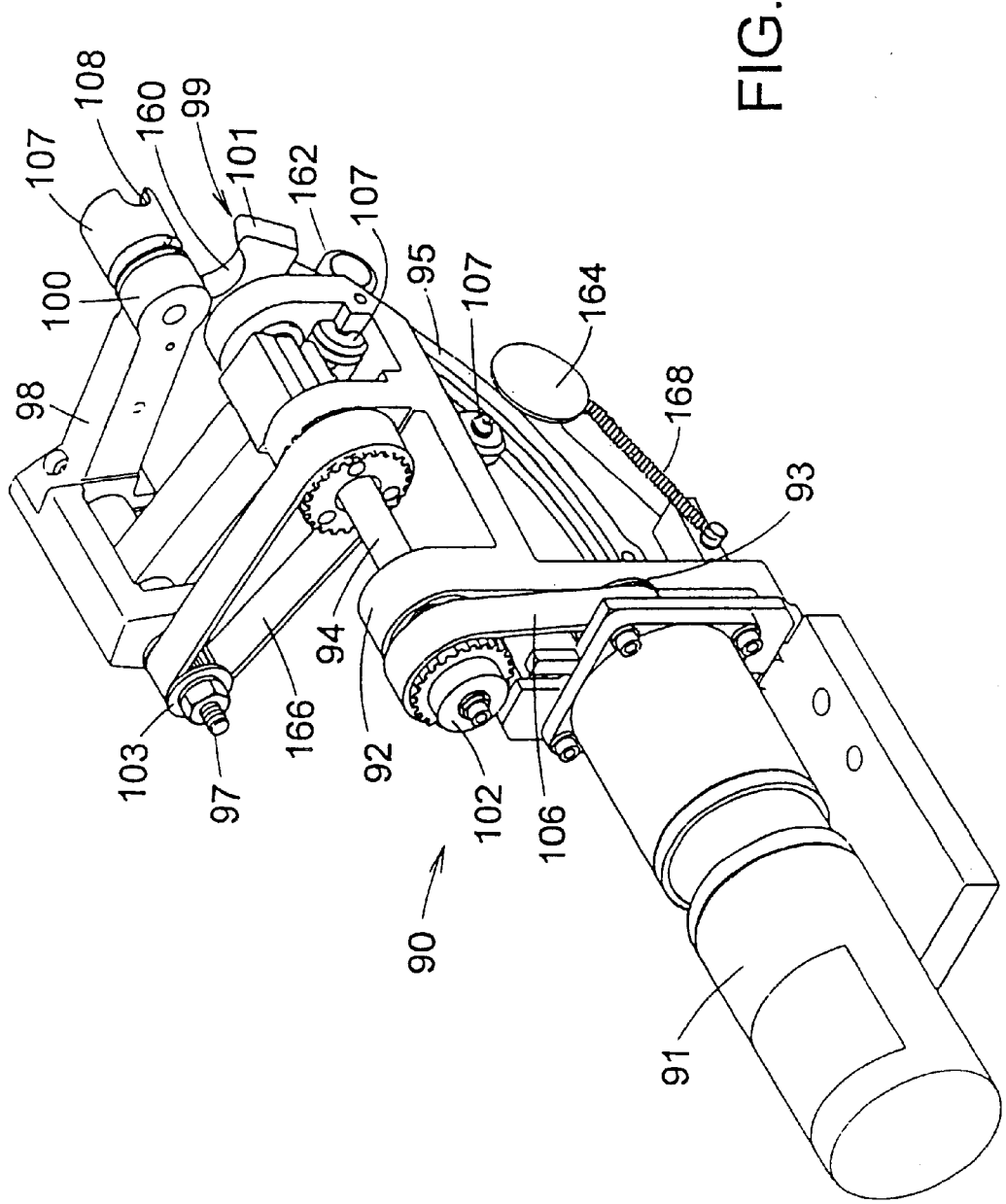
FIG. 30 is a front perspective view of the drop gate actuator which mounts to the cross slide module of the effector end assembly showing the drop gate actuator in the extended "up" position.
Figure 34:
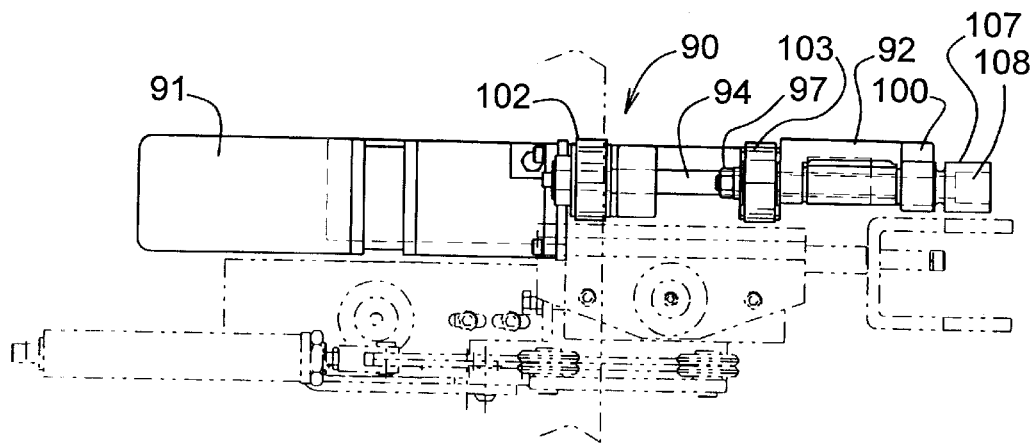
FIG. 34 is a top view showing the drop gate module, and showing the stack support actuator assembly in phantom lines of the end effector.
Figure 35:
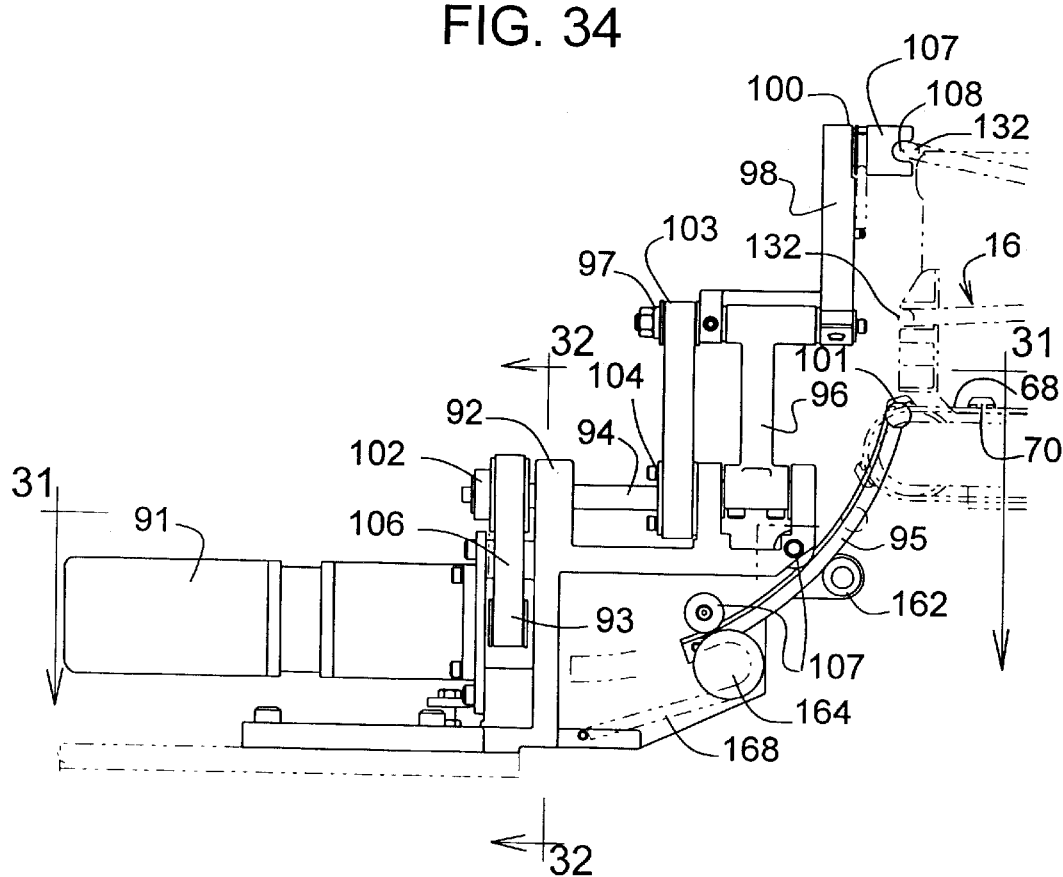
FIG. 35 is a side view of the drop gate actuator assembly mounted onto the end effector slide plate showing the arm in the raised position engaging the drop gate lever of the cartridge container in the raised position wherein the drop gate is lowered for receiving mail from a sorting apparatus.
Figure 36:
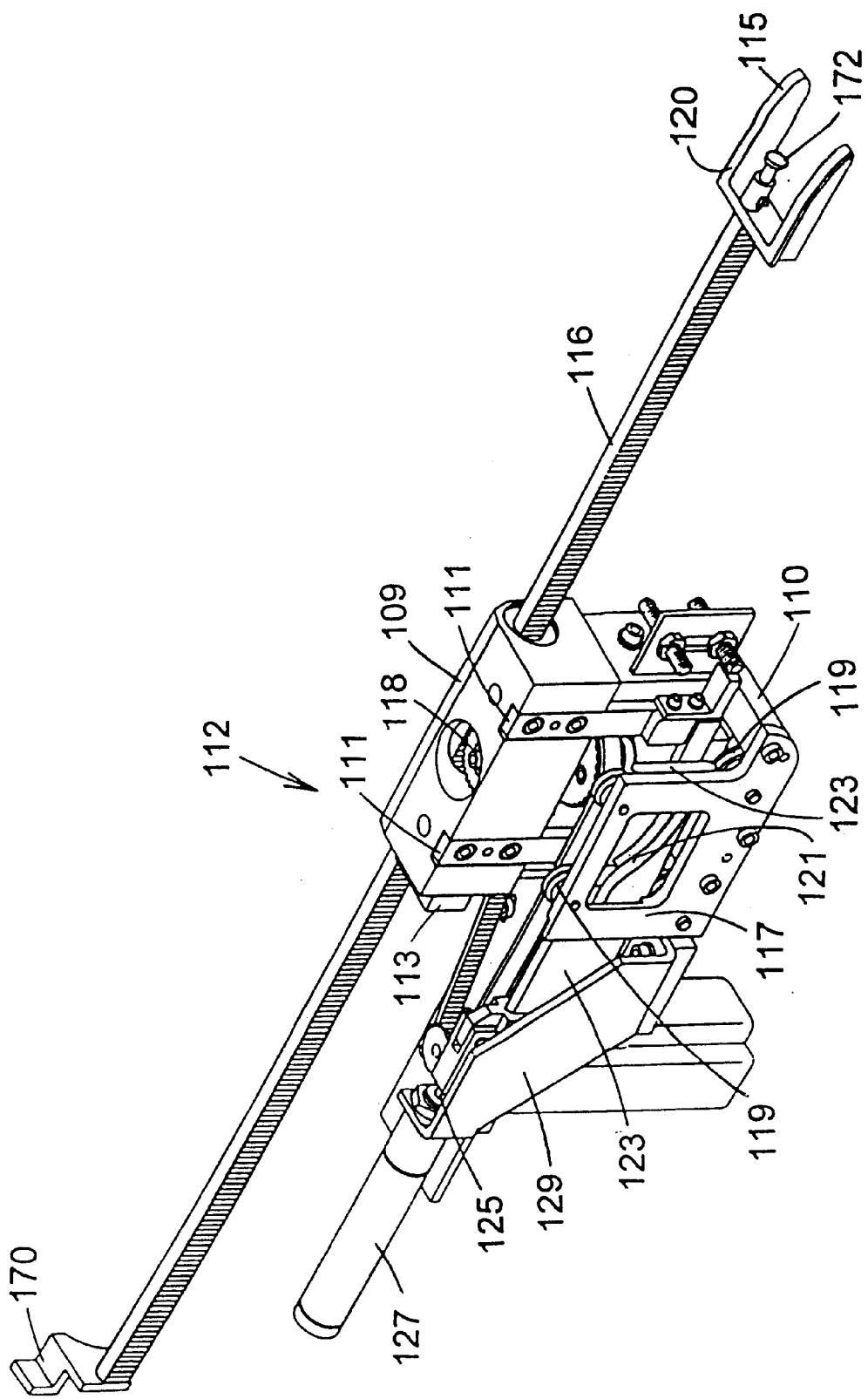
FIG. 36 is a front perspective view showing a stack support actuator.
Figure 37:
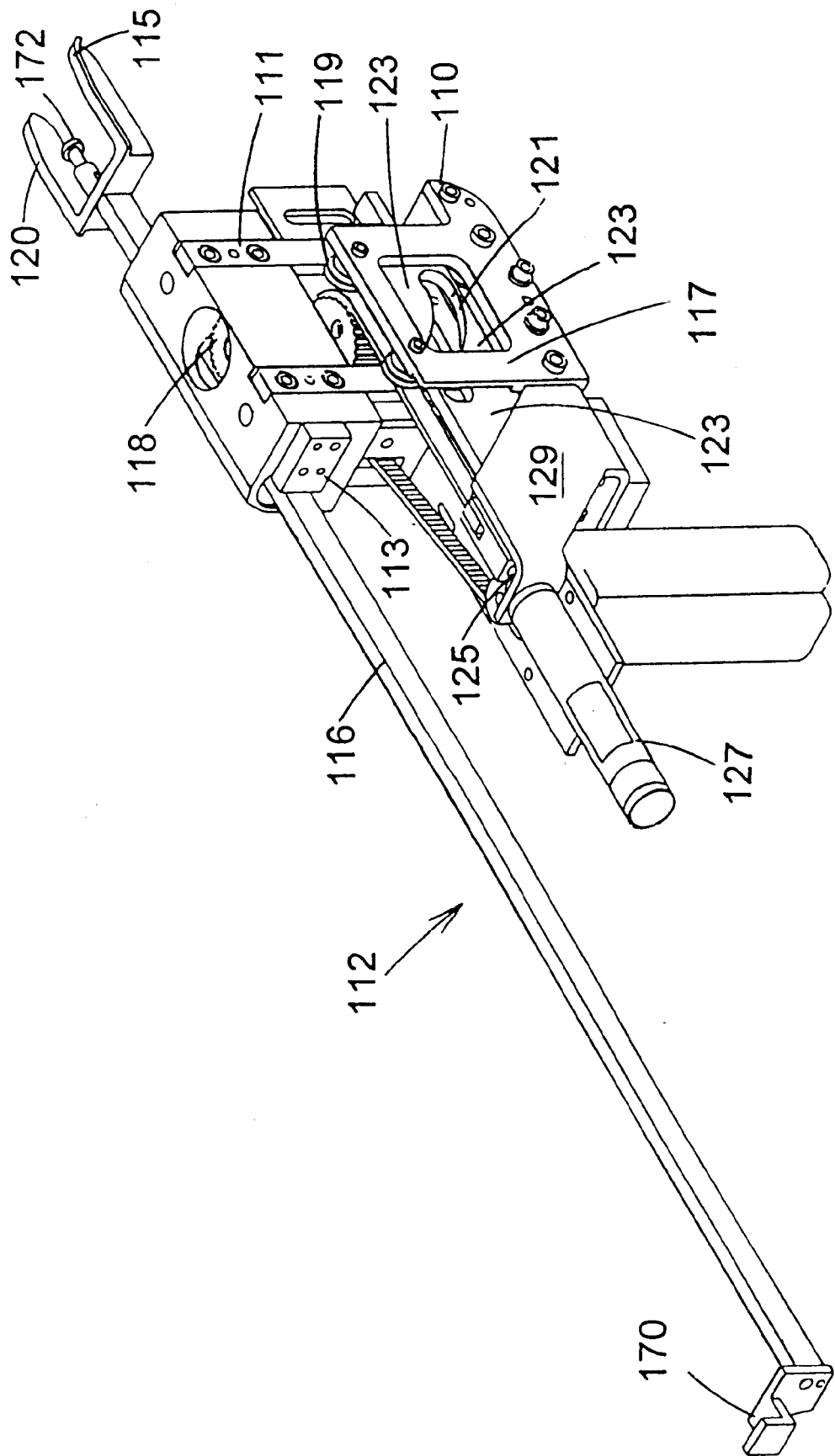
FIG. 37 is a rear perspective view showing the stack support actuator of FIG. 36.
Figure 40:
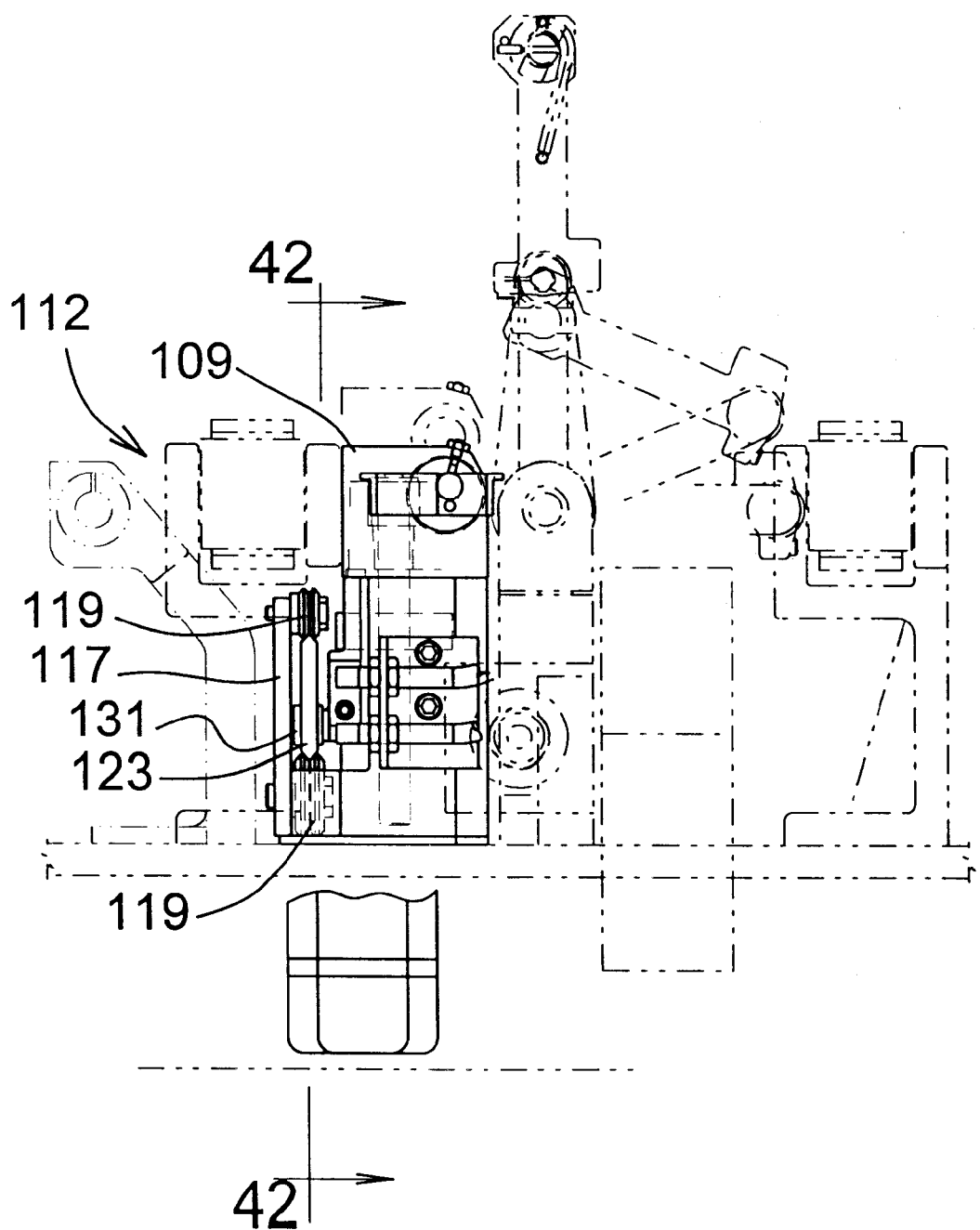
FIG. 40 is a front view of the effector head and stack support actuator of FIGS. 38 and 39, wherein a fork extending from the distal end of a rod or "rack" is extendable back and forth by a pinion gear driven by a motor. The mounting plate and drop gate assembly are shown in phantom lines.
Figure 41:
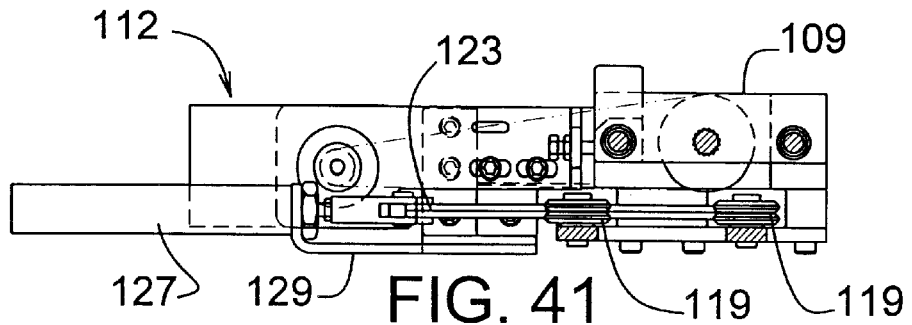
FIG. 41 is a sectional view of the stack support actuator taken through FIG. 38 showing the drive mechanism and timing belt for the cam assembly and cam track.
Figure 42:
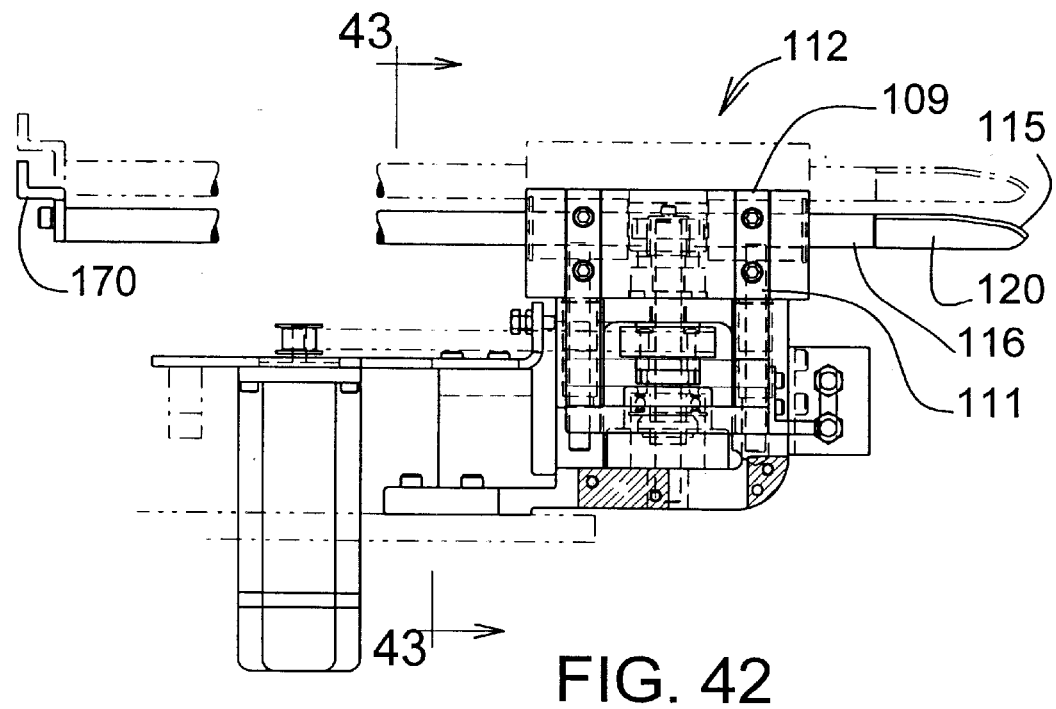
FIG. 42 is a section along lines 43—43 taken through FIG. 40 showing the motor and drive belt (in phantom lines), and pulleys.
Figure 43:
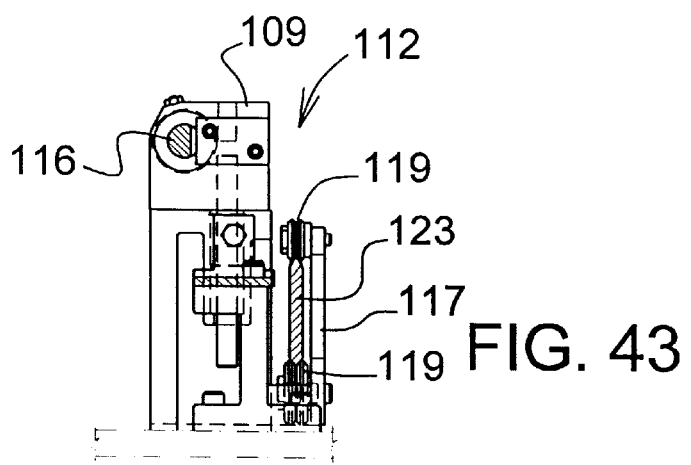
FIG. 43 is a sectional view taken through FIG. 42 showing the guide rollers on the cam track.
Figure 44:
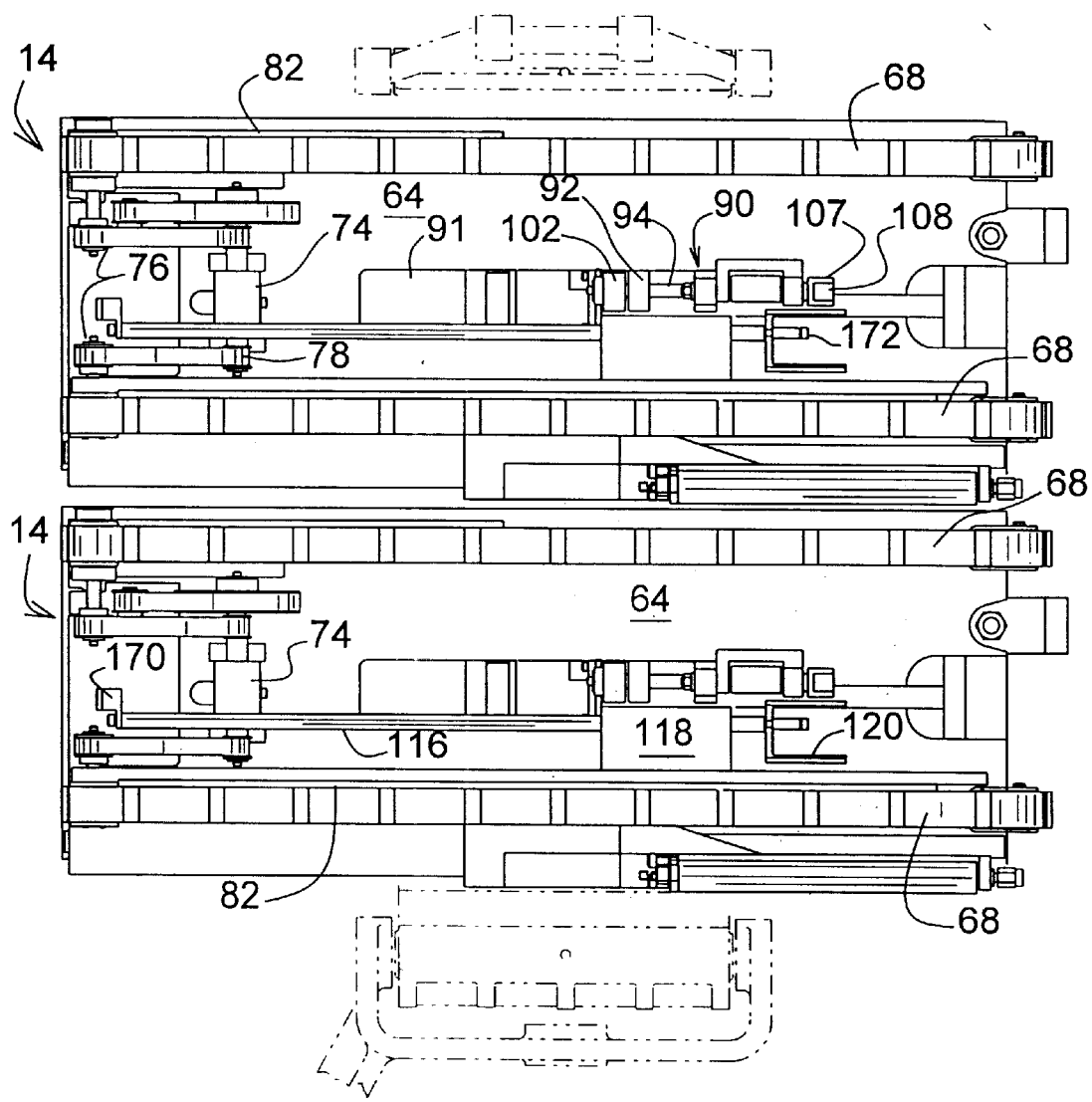
FIG. 44 is a top view of a pair of end effectors showing a pair of stack support actuators, a pair of drop gate actuators, and a pair of conveyor modules mounted on the cross slide module showing the saddle and trunions in phantom lines.
Figure 45:
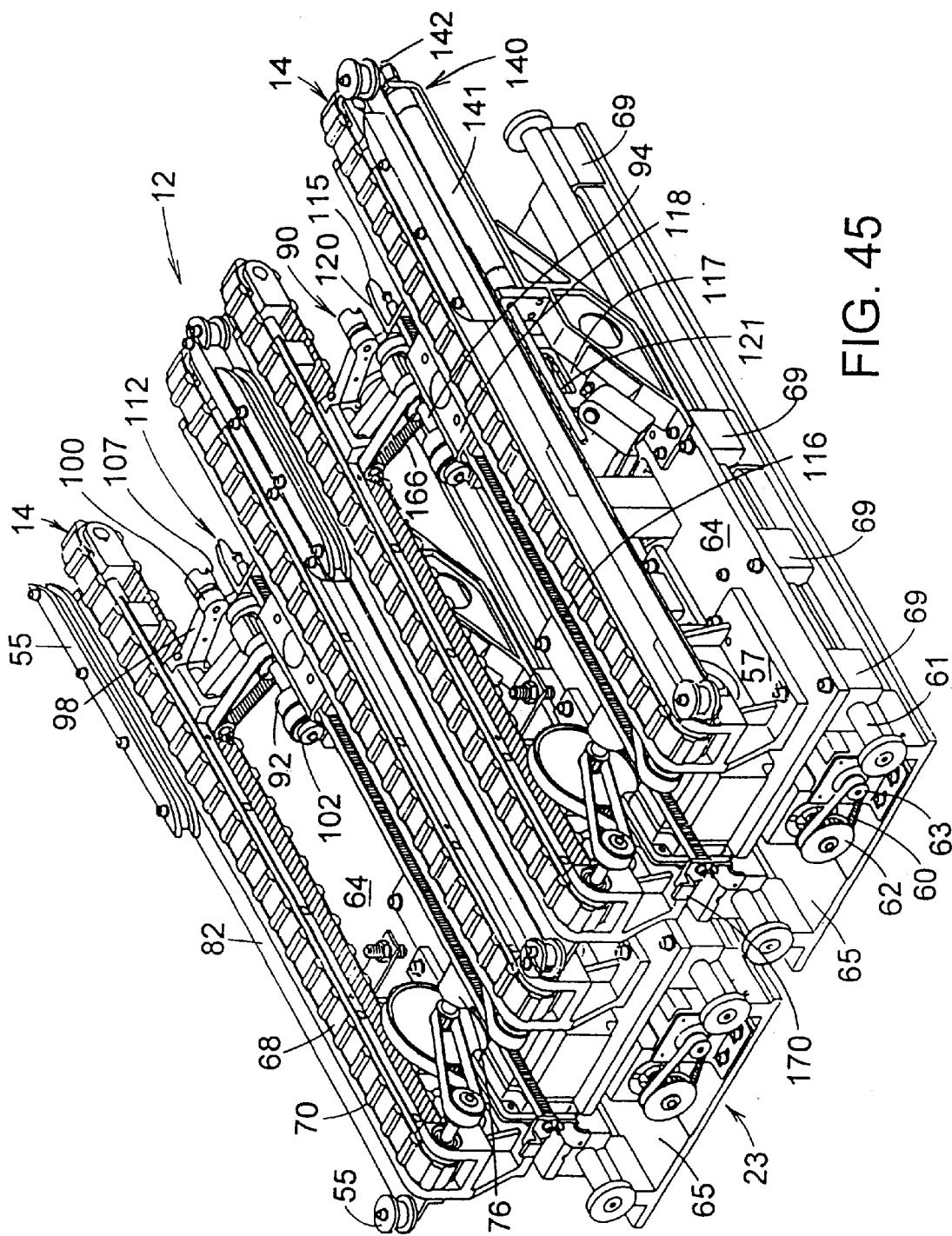
FIG. 45 is a perspective view of FIG. 44 showing details of the pair of end effectors with a pair of stack support actuators, a pair of drop gate actuators, and a pair of conveyor modules mounted on the cross slide module.
Figure 46:
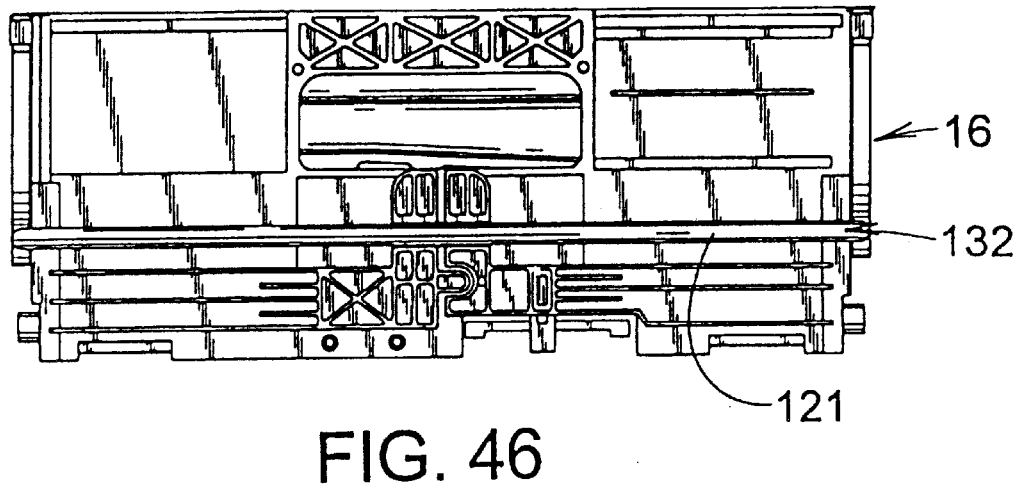
FIG. 46 is a front view of the cartridge showing the horizontal drop gate which is cooperatively engageable with the drop gate actuator of the end effector.
Figure 47:
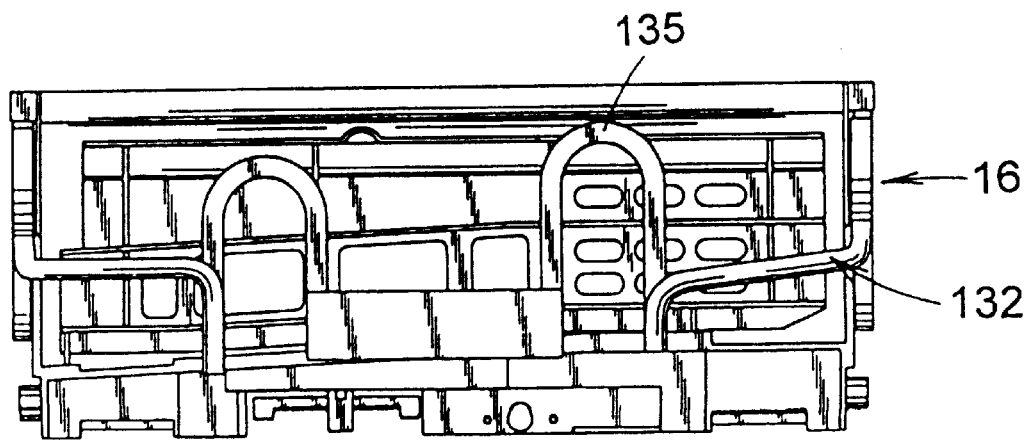
FIG. 47 is a rear end view of the cartridge which abuts and is cooperatively engageable with a mail sorter.
Figure 48:
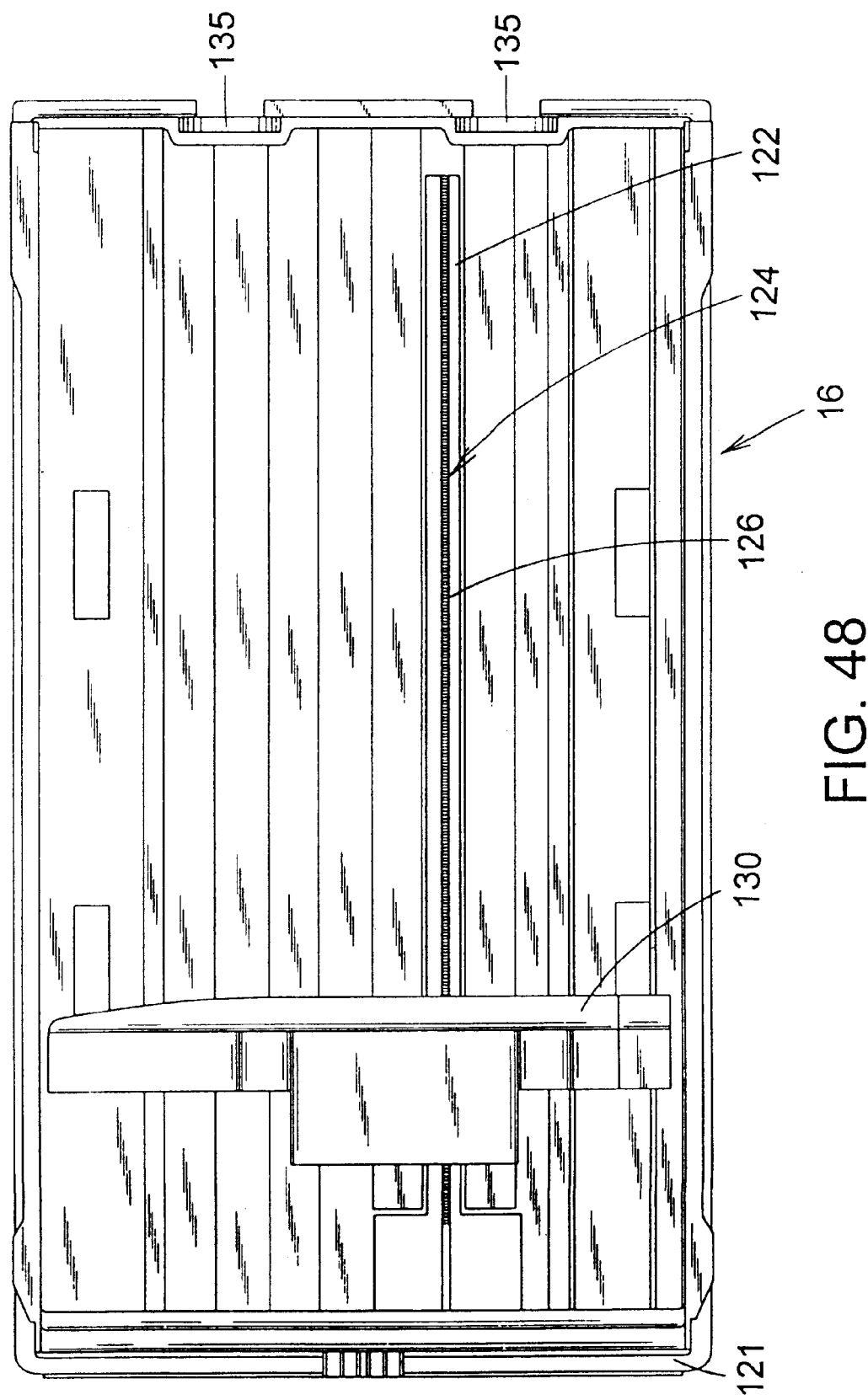
FIG. 48 is a top view of a cartridge showing the slot having a longitudinal notched member therein and showing a stack support in cooperative engagement therewith, and the peripheral drop gate pivot rod extending therearound.
Figure 49:
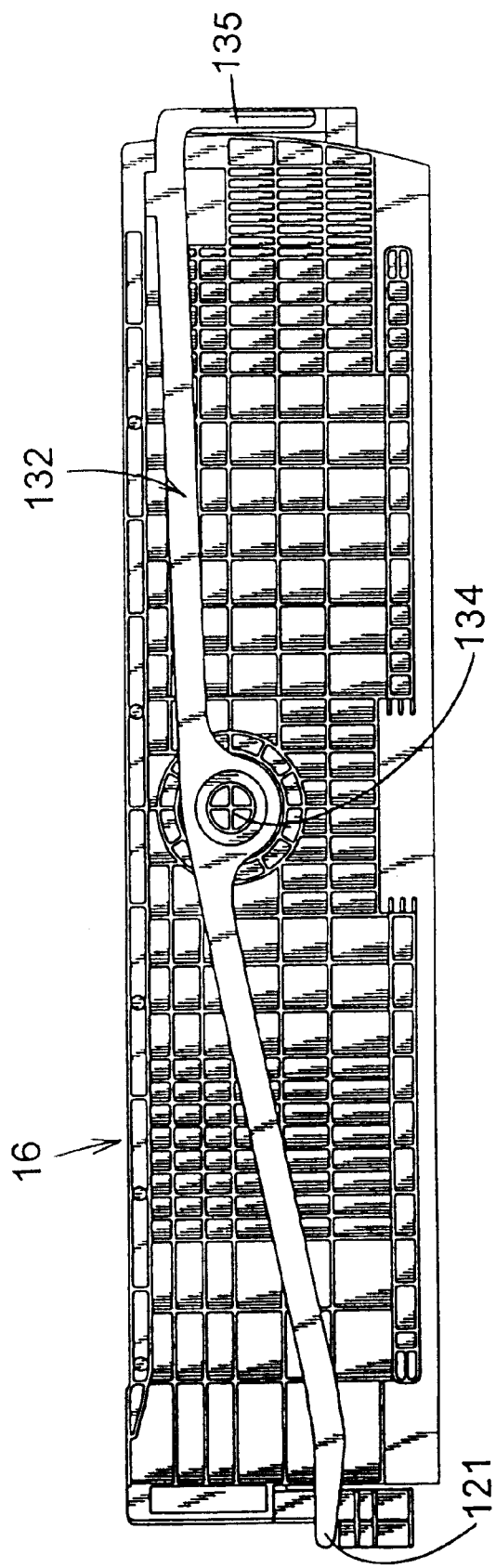
FIG. 49 is a side view of the cartridge showing the drop gate rod pivot point.

Moreover, as best shown in FIGS. 29 and 33, a cartridge drop gate spring depressor 99 having a head 101 with a concave surface 160 for cooperatively engaging the socket 107 of the drop gate in the down position extends from the distal end of a curved push arm 95. The push arm 95 is supported by frame 92 and guided by cam rod bearing 162 and a pair of vee guide wheels 107. The push arm 95 slides over a spring retainer 164 biased by spring 168 for working simultaneously with the drop gate 90. The cartridge drop gate spring depressor 164 raises in unison with the drop gate socket 107 and releases drop gate 132 holding/retaining members on the bottom of the cartridge 16 upon engagement of the drop gate socket 107 with the drop gate 132.

As best illustrated in FIGS. 36–43, a stack support actuator assembly 112 supported by a stack support base 114 is mounted upon the cross slide module 23 of the effector end 12. The actuator defines a rack "rod" 116 and pinion 118 assembly whereby the horizontal member or rack 116 extends through a block stack support 109 having a stop block 113. The rear end of the rack includes a carriage pull finger 170 front end of the rack 116 defines a "two prong" or "fork" 120 shape tool for cooperative engagement with a stack support 130 of a container "cartridge" 16. The fork 120 a release plunger 172 disposed inbetween the tines and a downwardly angled lifting surface 115 providing a means to engage a container (cartridge) 16 within a slot of the mail sorting apparatus 18 and lift a stack support 130 vertically disengaging the stack support 130 from a rod 121 forming a locking bar mechanism in the container 16.

The stack support actuator assembly 112 is mounted to a support block 109 which is mounted by slide bars 111 in cooperative sliding engagement supported by a frame 110. The frame 110 includes a roller plate 117 extending upwardly, spaced apart from, in alignment with, and opposite to, the support block 109. At least one and preferably two sets of spaced apart vee guide rollers 119 extend inwardly in alignment with one another from the top and bottom of the roller plate 117. A cam plate 123 having an "S-curve" track 121 is held between the vee guide rollers 119 of the roller plate 117. The cam plate 123 is attached in the rear to a plunger 125 extending from a cylinder 127 mounted to a cylinder mount 129. Extending from the support block 109 is a roller 131 which rolls along the cam plate track 121 providing forward lifting movement to the block 109 and stack support actuator assembly 112 mounted thereon upon actuation of the cylinder 127. The cam mechanism provides good acceleration and declaration. For instance, a 2½ inch stroke lifts the fork 120 by about one inch.

The preferred embodiment of the container or cartridge 16 is formed of a plastic material; however, it is anticipated that metal or other material may utilized therefor. The container 16 of the preferred embodiment defines a mail cartridge formed having indentations 72 on the bottom thereof for positive cooperative engagement with the conveyor belts 68 of the belt conveyor module 14 of the end effector assembly 12. A mail cartridge 16 is formed providing a generally rectangular box having a centrally located slot 122 extending at least a portion of the length thereof. A longitudinal member or rod 124 having notches 126 therealong defines a lock bar for cooperative engagement with an article "mail" stack support member 130 engageable from the bottom of the cartridge by fork 120 of the stack support actuator module 19 of the effector head assembly 12. A constant force spring provides back pressure so that mail feeding into the cartridge does not collapse the stack support member 130.

As shown in FIGS. 15–17, and 24 and best shown in FIGS. 39–42, the container 16 also utilizes a drop gate 132 which is formed from a peripheral rod 121 extending around the exterior sidewall of the container 16 attached thereto by a centrally located pivot point 134. The rod 121 forms a rear engaging mechanism defining a pair of loops for cooperative engagement with a sorting apparatus 18 for retaining the mail articles therein and having a centrally positioned horizontal front section 128 for cooperative engagement with the drop gate actuator 90. As shown in the drawings, while the drop gate 132 is up in the back of the cartridge 16, mail from a sorter 18 is fed into the cartridge 16 abutting the stack support member 130 of the cartridge 16 and moving it forward to fill the cartridge 16 with a predetermined amount of mail.

As best shown in FIGS. 15, 22, 26 and 27, a clearing gate actuator 140 utilizes a cylinder 141 having a bumper 142 extending from a plunger to interface with a clearing gate of a mail sorter which sweeps the mail downward into the cartridge 16 compressing the mail slightly and moving it toward the stack support member 130. As the drop gate actuator 90 engages and pulls the peripheral rod 121 of the drop gate 132 down in the front of the cartridge 16, the loops 135 pivot upward between the mail and sorter 18 holding the mail securely for movement by the end effector assembly 12 to a desired position.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:
1. A robotic container handling system, comprising:
   a magnetic positioning system comprising a first rail including a top surface connecting side surfaces and a bottom surface, said first rail including at least one magnet bank of permanent magnets extending there along one side;
   a second rail spaced apart from and extending parallel to said first rail;
   a base platform having a plurality of rail rollers attached to the outer portion of said base platform for supporting and guiding said base platform along said first rail and said second rail;
   at least one linear-servo motor attached to said base extending downward along a side of said base platform spaced apart from and in close proximity to said permanent magnets of said first rail in electromagnetic communication with said permanent magnets;
   a plurality of positioning rollers for maintaining a constant distance between said at least one linear servo-motor mounted onto said base platform and said permanent magnet mounted to said first rail;
   a frame extending upwardly from said base comprising at least one support column extending upward from said base and a support saddle extending from said support column said support saddle being movable in the vertical axis and pivotable from side to side and front to back.
2. A robotic parts handling system, comprising:
   a platform forming a base including at least one linear servo magnetic motor affixed to and extending along the side beneath said platform;
   a track including a first master rail and a second minor balancing rail;
   a plurality of supporting rollers supporting and holding said platform to said first master rail and said second minor balancing rail;

a plurality of magnets mounted along the length of said first master rail for cooperative magnetic engagement with said at least one linear servo magnetic motor;

a plurality of positioning rollers mounted to said platform for maintaining a constant distance between said linear servo magnetic motor and said magnets mounted to said first master rail;

a computer control unit;

means in close proximity to said rail for generating pulses readable by a reader in communication with said control unit for positioning said platform at selected positions upon said rail;

a frame mounted upon said platform including at least one pair of vertical rails spaced apart from and in alignment with one another;

a pair of slide members each one including a plurality of rollers cooperatively engaging said vertical rails;

means extending along said vertical rails in cooperative engagement with said slide members for moving said slide members up and down independently of one another along the Y-axis;

a saddle having distal ends extending inbetween said vertical rails attaching to said slide members, said saddle being tiltable from side to side and from front to back;

means for tilting said saddle from front to back along the x-axis;

at least one end effector mounted onto said saddle including means for engaging and removing a container from a preselected position on one side of said platform and transferring said container to the opposite side of the platform and positioning and releasing said container in a selected location.

3. The robotic container handling system of claim 1, said computer controlling and coordinating movement of said robotic container handling system.

4. The robotic container handling system of claim 1, including means for aligning said base platform with a selected point on said first rail or said second rail.

5. The robotic container handling system of claim 4, wherein said means for aligning said base platform with a selected point on said first rail or said second rail comprises a magnetic strip in close proximity thereto for generating, transmitting, or reflecting pulses readable by a reader in communication with said computer for positioning said base platform at selected positions along said first rail.

6. The robotic container handling system of claim 1, said frame mounted upon said base platform having at least one pair of vertical rails spaced apart from and in alignment with one another supporting a pair of slide members, each one including a plurality of rollers cooperatively engaging the vertical rails and including means for moving said slide members along said vertical rails.

7. The robotic container handling system of claim 6, said means for moving said slide members along said vertical rails comprises a pair of timing belts, each one extending along one of said vertical rails in cooperative engagement with said slide members moving said slide members up and down independently of one another or together along the Y-axis.

8. The robotic container handling system of claim 7, wherein said saddle includes a first distal end and a second distal end extending inbetween said vertical rails and attaching to said slide members for supporting an object thereon and for moving said first distal and said second distal end of said saddle and object supported thereby up and down independently of one another or together along the y-axis.

9. The robotic container handling system of claim 8, including means for tilting said saddle and object supported thereon in the x-axis.

10. The robotic container handling system of claim 9, wherein said means for tilting said saddle and object supported thereon in the x-axis comprises a cylinder.

11. The robotic container handling system of claim 1, including means mounted onto said base platform for engaging and removing a container from a preselected position on one side of said platform and transferring the container to the opposite side of the platform and positioning and releasing the container in a selected location.

12. The robotic container handling system of claim 1, said end effector engaging and removing a container from a preselected position on one side of said base platform and transferring the container to the opposite side of the base platform and positioning and releasing the container in a selected location.

13. The robotic container handling system of claim 8, including means mounted onto said saddle for engaging and removing a container from a preselected position on one side of said platform and transferring the container to the opposite side of the platform and positioning and releasing the container in a selected location.

14. The robotic container handling system of claim 1, a digital magnetic positioning system for aligning said base platform with a selected position on said first rail or said second rail.

15. The robotic container handling system of claim 1, including means for handling a conveyor mounted to said support saddle.

16. The robotic container handling system of claim 1, including means for braking said base platform along said first rail.

17. The robotic container handling system of claim 1, including means for braking said slide members cooperatively engaging said vertical support column.

18. The robotic container handling system of claim 1, wherein said linear-servo motor attached to said base platform is spaced apart from said permanent magnets providing a gap of about 0.020 inches thereinbetween.

19. The robotic container handling system of claim 1, wherein said base platform is supported by rollers contacting said first rail.

20. The robotic container handling system of claim 1, wherein said second rail is a minor rail provided only for stability.

21. The robotic container handling system of claim 1, said second rail including a top surface connecting side surfaces and a bottom surface and at least one magnet bank of permanent magnets extending there along one side for cooperatively engaging a second linear servo motor.

22. The robotic container handling system of claim 1, including a plurality of positioning rollers comprising guide wheels for separating and holding the linear servo motors a selected distance from said permanent magnets extending along said first rail.

\* \* \* \* \*